United States Patent
Kinno et al.

(10) Patent No.: US 7,200,585 B2
(45) Date of Patent: Apr. 3, 2007

(54) IDENTIFIER GENERATING METHOD, IDENTITY DETERMINING METHOD, IDENTIFIER TRANSMITTING METHOD, IDENTIFIER GENERATING APPARATUS, IDENTITY DETERMINING APPARATUS, AND IDENTIFIER TRANSMITTING APPARATUS

(75) Inventors: Akira Kinno, Yokohama (JP); Minoru Etoh, Yokohama (JP); Yoshifumi Yonemoto, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 586 days.

(21) Appl. No.: 10/659,308

(22) Filed: Sep. 11, 2003

(65) Prior Publication Data
US 2004/0122851 A1 Jun. 24, 2004

(30) Foreign Application Priority Data
Sep. 12, 2002 (JP) ............................ P2002-267274

(51) Int. Cl.
G06F 17/00 (2006.01)

(52) U.S. Cl. ............................................. 707/2; 707/1
(58) Field of Classification Search ................ 707/101, 707/102, 103, 1, 2; 711/118
See application file for complete search history.

(56) References Cited

U.S. PATENT DOCUMENTS 6,249,844 B1 6/2001 Schloss et al.
6,539,396 B1 * 3/2003 Bowman-Amuah ..... 707/103 R

FOREIGN PATENT DOCUMENTS

JP 2001-282105 10/2001

OTHER PUBLICATIONS

Toshiro Takase, et al., "A Web Services Cache Architecture Based on XML Canonicalization", Poster of the Eleventh International World Wide Web Conference, XP-002326769, May 7, 2002, 6 pages.
Clifford Lynch, "Canonicalization: A Fundamental Tool to Facilitate Preservation and Management of Digital Information", D-Lib Magazine, vol. 5, No. 9, XP-002326770, Sep. 1999, 6 pages.
Andrei Z. Broder, et al., "Syntactic Clustering of the Web", Computer Networks and ISDN Systems, vol. 29, No. 8-13, XP-004095313, Sep. 1997, pp. 1157-1166.

(Continued)

Primary Examiner—Apu M. Mofiz
(74) Attorney, Agent, or Firm—Oblon, Spivak, McClelland, Maier & Neustadt, P.C.

(57) ABSTRACT

An identifier generating method according to the present invention has a canonicalization process step of subjecting document data to a canonicalization process to correct fluctuation of expression; and an identifier generating step of, based on all or part of document data having been subjected to the canonicalization process in the canonicalization process step, generating an identifier uniquely specifying the document data or part thereof. When the fluctuation of expression is corrected by the canonicalization process, prior to the generation of the identifier in this way, the XML documents or RDF documents with the same meaning are transformed into documents in the same expression, and the identical identifier can be generated for them by a function of generating an identifier from a sequence of characters, as typified by a one-way function.

17 Claims, 27 Drawing Sheets

OTHER PUBLICATIONS

S. Aissi, et al., "Schema Centric XML Canonicalization Version 1.0", http://xml.coverpages.org/SchemaCentricCanonicalization-20020213.html, XP-002326771, Feb. 13, 2002, pp. 1-42.

Graham Klyne, "CC/PP Attribute Vocabularies", http://www.w3.org/TR/2000/WD-CCPP-vocab-20000721, XP-002218349, Jul. 21, 2000, pp. 1-34.

* cited by examiner

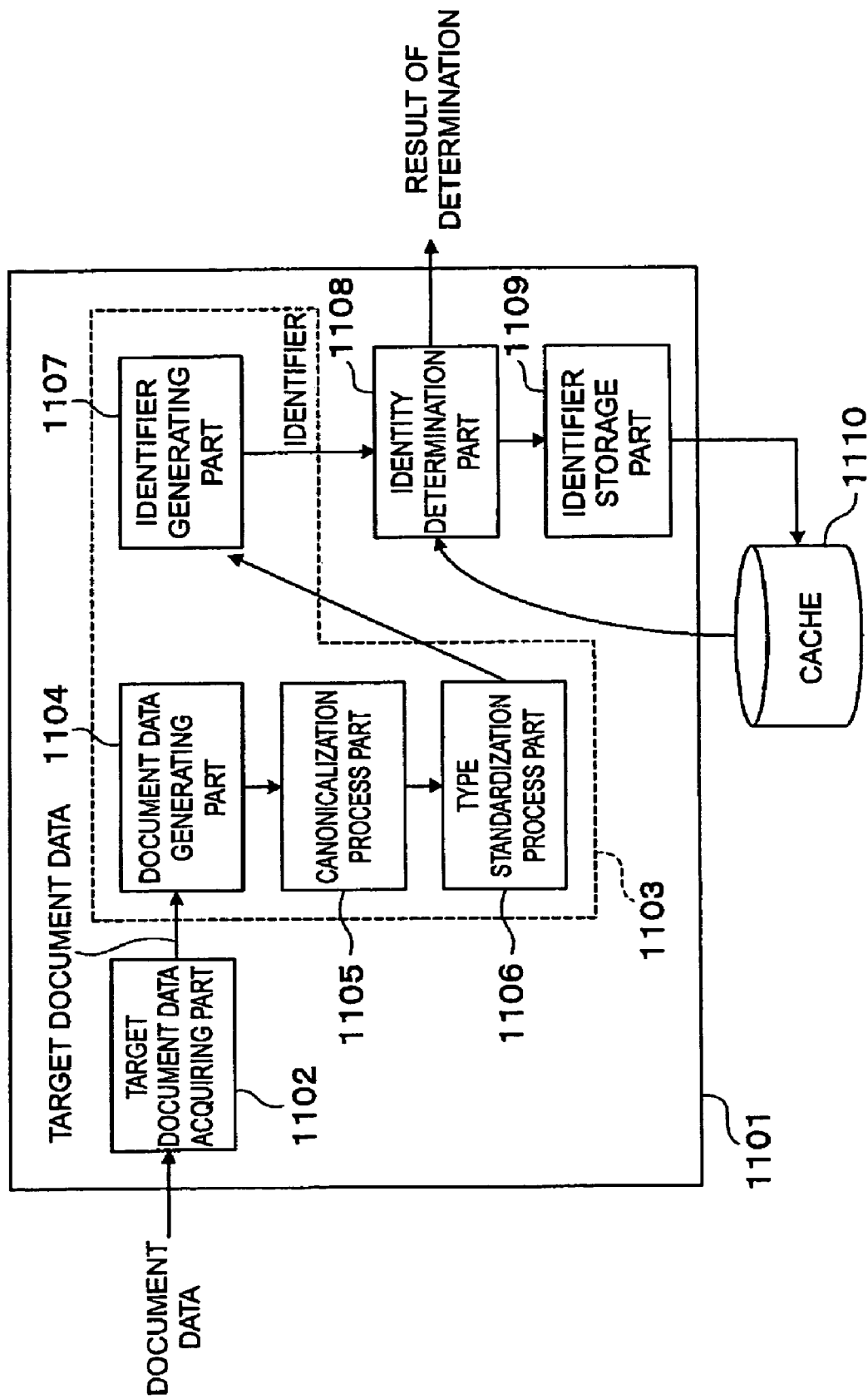

Fig.11

```xml
<?xml version="1.0"?>
<rdf:RDF xmlns:rdf="http://www.w3.org/1999/02/22-rdf-syntax-ns"
 xmlns:ccpp="http://www.w3.org/2000/07/04-ccpp"
 xmlns:prf="http://www.wapforum.org/profiles/UAPROF/ccppschema-20010330"
 xmlns:pss5="http://www.3gpp.org/profiles/PSS/ccppschema-PSS5"
 xmlns:up="http://www.nttdocomo.co.jp/profiles/UP/ccppschema-UP"
 xmlns:upf="http://www.nttdocomo.co.jp/profiles/UPF/ccppschema-UPF">
 <rdf:Description rdf:about="http://www.bar.com/Phones/Phone007">
  <ccpp:component>
   <rdf:Description     ID="UserProfile">
    <rdf:type rdf:resource="http://www.nttdocomo.co.jp/Profiles/UP/
     ccppschema-UP#UserProfile"/>
    <up:role>   guest    </up:role>
    <up:age>16</up:age>
   </rdf:Description>
  </ccpp:component>
 </rdf:Description>
</rdf:RDF>
```

Fig. 12

```
<?xml version="1.0"?>
<rdf:RDF xmlns:rdf="http://www.w3.org/1999/02/22-rdf-syntax-ns"
    xmlns:ccpp="http://www.w3.org/2000/07/04-ccpp"
    xmlns:prf="http://www.wapforum.org/profiles/UAPROF/ccppschema-20010330"
    xmlns:pss5="http://www.3gpp.org/profiles/PSS/ccppschema-PSS5"
    xmlns:up="http://www.nttdocomo.co.jp/profiles/UP/ccppschema-UP"
    xmlns:upf="http://www.nttdocomo.co.jp/profiles/UPF/ccppschema-UPF">
<rdf:Description rdf:about="http://www.bar.com/Phones/Phone007">
    <ccpp:component>
        <rdf:Description ID="UserProfile">
            <rdf:type rdf:resource="http://www.nttdocomo.co.jp/Profiles/UP/
                ccppschema-UP#UserProfile"></rdf:type>
            <up:role>guest</up:role>
            <up:age>16</up:age>
        </rdf:Description>
    </ccpp:component>
</rdf:Description>
</rdf:RDF>
```

Fig. 13

| DOCUMENT DATA IDENTIFIER | DOCUMENT DATA URI |
|---|---|
| .. | .. |
| 141325132 | www.foo.co.jp/sheet141325132.xml |
| 141325146 | www.foo.co.jp/sheet141325146.xml |
| 141325199 | www.foo.co.jp/sheet141325199.xml |
| .. | .. |

Fig.14A

DOCUMENT DATA 1

```
<?xml version="1.0"?>
<data>
    ..
    <value>
        12.0
    </value>
    ..
</data>
```

Fig.14B

DOCUMENT DATA 2

```
<?xml version="1.0"?>
<data>
    ..
    <value>
        12.00
    </value>
    ..
</data>
```

Fig.14C

CLASS DEFINITION FILE

```
<Schema name="myshema"
    xmlns="urn:shemas-microsoft-com:xml-data"
    xmlns:dt="urn:shemas-microsoft-com:datatypes">
        ..
        ..
    <ElementType name="value" dt:type="double"/>

</Schema>
```

Fig. 15A

DOCUMENT DATA 1

```
<?xml version="1.0"?>
<data>
    <value>
        12.000000000000
    </value>
    ..
</data>
```

Fig. 15B

DOCUMENT DATA 2

```
<?xml version="1.0"?>
<data>
    <value>
        12.00000000000000
    </value>
    ..
</data>
```

Fig.18A
DEFAULT

```xml
<?xml version="1.0"?>
<rdf:RDF xmlns:rdf="http://www.w3.org/1999/02/22-rdf-syntax-ns"
 xmlns:ccpp="http://www.w3.org/2000/07/04-ccpp"
 xmlns:prf="http://www.wapforum.org/profiles/UAPROF/ccppschema-20010330"
 xmlns:pss5="http://www.3gpp.org/profiles/PSS/ccppschema-PSS5"
 xmlns:up="http://www.nttdocomo.co.jp/profiles/UP/ccppschema-UP"
 xmlns:upf="http://www.nttdocomo.co.jp/profiles/UPF/ccppschema-UPF">
 <rdf:Description rdf:about="UserProfileDefault">
  <rdf:type rdf:resource="UserProfilePlatform"></rdf:type>
   <up:role>guest</up:role>
   <up:age>16</up:age>
 </rdf:Description>
</rdf:RDF>
```

Fig.18B
TARGET DOCUMENT DATA

```xml
<?xml version="1.0"?>
<rdf:RDF xmlns:rdf="http://www.w3.org/1999/02/22-rdf-syntax-ns"
 xmlns:ccpp="http://www.w3.org/2000/07/04-ccpp"
 xmlns:prf="http://www.wapforum.org/profiles/UAPROF/ccppschema-20010330"
 xmlns:pss5="http://www.3gpp.org/profiles/PSS/ccppschema-PSS5"
 xmlns:up="http://www.nttdocomo.co.jp/profiles/UP/ccppschema-UP"
 xmlns:upf="http://www.nttdocomo.co.jp/profiles/UPF/ccppschema-UPF">
 <rdf:Description rdf:about="MyProfile">
  <ccpp:component>
   <rdf:Description ID="UserProfile">
    <rdf:type rdf:resource="UserProfilePlatform"></rdf:type>
    <ccpp:defaults rdf:resource="UserProfileDefault"></ccpp:defaults>
    <up:role>vip</up:role>
   </rdf:Description>
  </ccpp:component>
 </rdf:Description>
</rdf:RDF>
```

Fig.19

TRANSFORMED DOCUMENT DATA

```
<?xml version="1.0"?>
<rdf:RDF xmlns:rdf="http://www.w3.org/1999/02/22-rdf-syntax-ns"
 xmlns:ccpp="http://www.w3.org/2000/07/04-ccpp"
 xmlns:prf="http://www.wapforum.org/profiles/UAPROF/ccppschema-20010330"
 xmlns:pss5="http://www.3gpp.org/profiles/PSS/ccppschema-PSS5"
 xmlns:up="http://www.nttdocomo.co.jp/profiles/UP/ccppschema-UP"
 xmlns:upf="http://www.nttdocomo.co.jp/profiles/UPF/ccppschema-UPF">
 <rdf:Description rdf:about="MyProfile">
  <ccpp:component>
   <rdf:Description ID="UserProfile">
    <rdf:type rdf:resource="UserProfilePlatform"></rdf:type>
    <up:role>vip</up:role>
    <up:age>16</up:age>
   </rdf:Description>
  </ccpp:component>
 </rdf:Description>
</rdf:RDF>
```

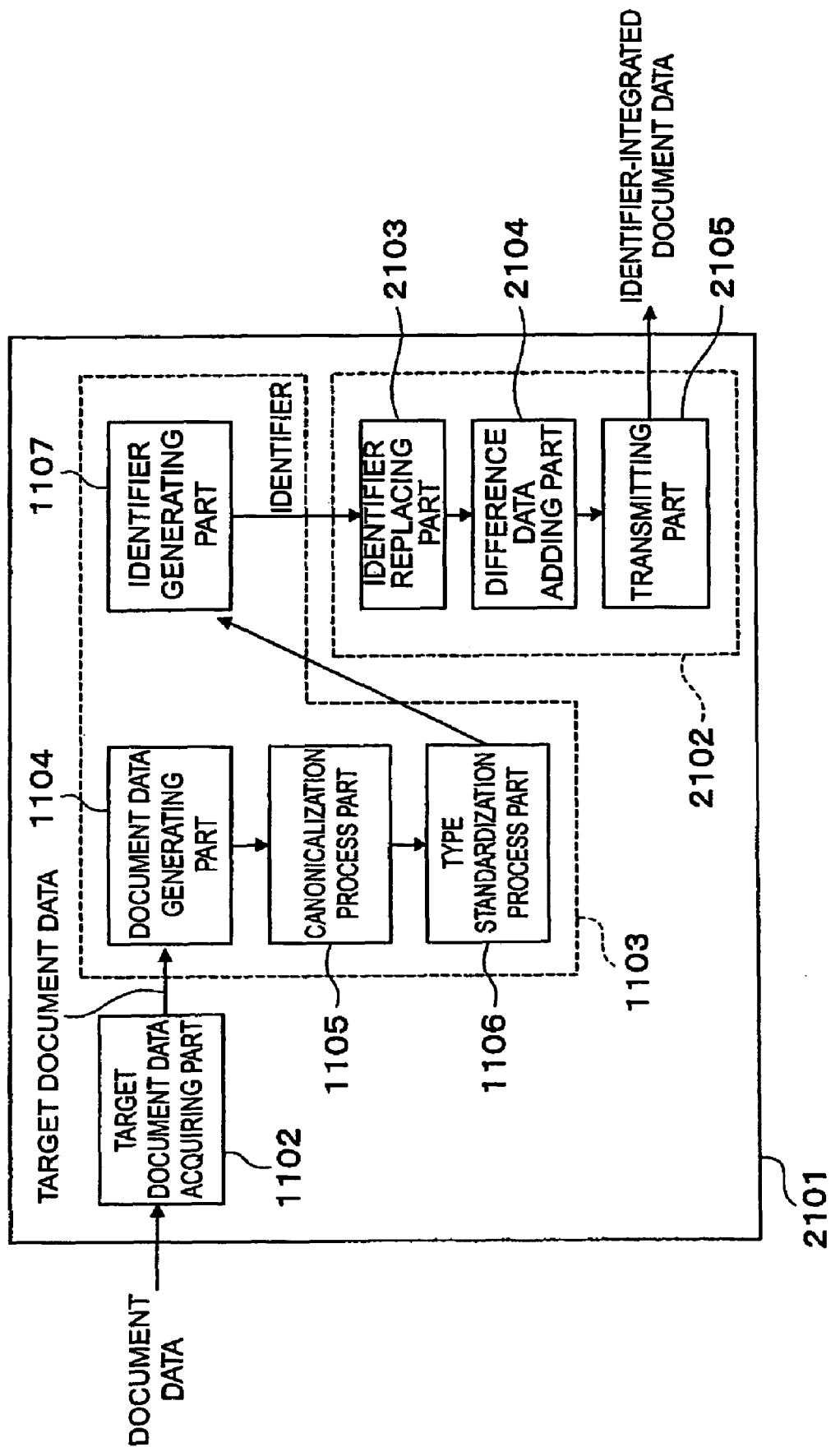

Fig.22

```xml
<?xml version="1.0"?>
<rdf:RDF xmlns:rdf="http://www.w3.org/1999/02/22-rdf-syntax-ns#"
         xmlns:ccpp="http://www.w3.org/2000/07/04-ccpp#">
    <rdf:Description rdf:about="MyProfile">

<ref id="124515146146"/>

<ref id="145256753415"/>

<ccpp:component>
            <rdf:Description rdf:about="TerminalBrowser">
                <rdf:type rdf:resource="BrowserUA" />
                <ccpp:defaults rdf:resource="UADefault" />
            </rdf:Description>
        </ccpp:component>

</rdf:Description>
</rdf:RDF>
```

IDENTIFIER GENERATING METHOD, IDENTITY DETERMINING METHOD, IDENTIFIER TRANSMITTING METHOD, IDENTIFIER GENERATING APPARATUS, IDENTITY DETERMINING APPARATUS, AND IDENTIFIER TRANSMITTING APPARATUS

BACKGROUND OF THE INVENTION

1. Field of the Invention

The present invention relates to a method of generating an identical identifier for multiple document data different in expression but identical in meaning, a method of determining identity, using the identifier, a method of transmitting the identifier thus generated, an identifier generating apparatus, an identity determining apparatus, and an identifier transmitting apparatus.

2. Related Background Art

The dissemination of XML is directing attention to Web services of architecture for implementing dynamic connections of various services present on wide area networks typified by the Internet.

In the Web services, the XML techniques are considered to be utilized for description of network protocols and service interfaces, management of contents, etc., but file sizes of XML documents are much larger than those of existing HTTP messages, because the XML documents adopt the description with tags. For this reason, there arises the problem that the load is heavier on the networks and the processing time at terminals or servers becomes longer. Consideration is thus directed toward processing based on identifiers uniquely generated from XML documents, in order to lessen the load on the networks and simplify the processing.

An identifier generating method is a method of regarding an XML document as a sequence of characters and generating as an identifier a result value obtained by a one-way function (e.g., reference is made to Japanese Patent Application Laid-Open No. 2001-282105). In order to simplify the description of XML documents, however, the XML Specification has flexibility to prevent the XML processing from being affected by fluctuation of expression depending upon describers of XML documents; for example, any number of white spaces may be interposed without any effect, a close tag may be omitted, comments can be described, a document may be described in any desired way as long as it is described along definitions of types, and so on. The RDF Specification permits constituent elements of document data to be described in any order, so that the entire document data can be handled in the same meaning. In the CC/PP Specification defined according to the RDF Specification, an URI can be used to specify default data originally defined and a difference therefrom is described, thereby enabling omission of the description of data except for the difference. In the above-described prior art, therefore, even XML documents or RDF documents with the same original meaning can probably be considered to be different documents when the documents are analyzed as sequences of characters, because of fluctuation of expression or the difference of types, the difference of ordering of constituent elements, the description by default data and difference data, and so on. Namely, since identifiers are generated using the one-way function or the like from XML documents or RDF documents, an identical identifier is not always generated for documents with the same meaning.

SUMMARY OF THE INVENTION

The present invention has been accomplished to solve the above problem and an object of the invention is to provide an identifier generating method of generating an identical identifier for XML documents or RDF documents being documents with the same original meaning, an identity determining method of determining identity of multiple document data, using the identifier, an identifier transmitting method of transmitting the identifier, and identifier generating apparatus, identity determining apparatus, and identifier transmitting apparatus capable of implementing those methods.

An identifier generating method (identifier generating apparatus) according to the present invention comprises: a canonicalization process step (canonicalization process means) of subjecting document data to a canonicalization process to correct fluctuation of expression; and an identifier generating step (identifier generating means) of generating an identifier uniquely specifying the document data or part thereof, based on all or part of the document data having been subjected to the canonicalization process in the canonicalization process step.

The above identifier generating method (identifier generating apparatus) may be characterized in that the canonicalization process step (canonicalization process means) comprises a type standardization process step (type standardization process means) of, using a class definition file of the document data describing a definition of a type, standardizing a type of expression for a value described in the document data, in accordance with the type defined by the class definition file.

The above identifier generating method (identifier generating apparatus) may be characterized in that the type standardization process step (type standardization process means) is configured to standardize an accuracy of numerical data described in the document data, in accordance with a definition of a type for numerical data described in the class definition file of the document data.

The above identifier generating method (identifier generating apparatus) may be characterized in that the canonicalization process step (canonicalization process means) comprises a document data generating step (document data generating means) of transforming first partial data and second partial data into document data in accordance with a predetermined transformation rule.

An identity determining method (identity determining apparatus) according to the present invention comprises a canonicalization process step (canonicalization process means) of subjecting document data to a canonicalization process to correct fluctuation of expression; an identifier generating step (identifier generating means) of generating an identifier uniquely specifying the document data or part thereof, based on all or part of the document data having been subjected to the canonicalization process in the canonicalization process step (by the canonicalization process means); and an identity determining step (identity determining means) of determining whether there is a common portion between one document data and another document data, based on the identifier having been generated in the identifier generating step (by the identifier generating means).

The above identity determining method (identity determining apparatus) may be characterized in that the canonicalization process step (canonicalization process means) comprises a type standardization process step (type standardization process means) of, using a class definition file of the document data describing a definition of a type, standardizing a type of expression for a value described in the document data, in accordance with the type defined by the class definition file.

The above identity determining method (identity determining apparatus) may be characterized in that the type standardization process step (or means) is configured to standardize an accuracy of numerical data described in the document data, in accordance with a definition of a type for numerical data described in the class definition file of the document data.

The above identity determining method (identity determining apparatus) may be characterized in that the canonicalization process step (canonicalization process means) comprises a document data generating step (document data generating means) of transforming first partial data and second partial data into document data in accordance with a predetermined transformation rule.

The above identity determining method may be characterized in that it further comprises an identifier storing step of preliminarily storing the identifier having been generated in the identifier generating step, into a cache in correlation with the document data or a result of a predetermined process on the document data, and in that the identity determining step is configured to: perform a search inside the cache on the basis of the identifier of the document data as a target for a determination on identity, which has been generated in the identifier generating step, determine that there exists identical document data, if the same identifier as the aforementioned identifier is present, and determine that there exists no identical document data, if the same identifier as the aforementioned identifier is absent.

The above identity determining apparatus may be characterized in that it further comprises a cache preliminarily storing the identifier having been generated by the identifier generating means, in correlation with the document data or a result of a predetermined process on the document data, and in that the identity determining means is configured to: perform a search inside the cache on the basis of the identifier of the document data as a target for a determination on identity, which has been generated by the identifier generating means, determine that there exists identical document data, if the same identifier as the aforementioned identifier is present, and determine that there exists no identical document data, if the same identifier as the aforementioned identifier is absent.

The above identity determining method may be characterized in that it further comprises a second identifier generating step of generating an identifier uniquely specifying the document data or part thereof, based on all or part of the document data, prior to the canonicalization process step, and in that identity between one document data and another document data is determined on the basis of the identifier having been generated in the second identifier generating step, processing is terminated without execution of the next process step if the two document data are determined to be identical, and processing is transferred to the canonicalization process step if they are determined not to be identical.

The above identity determining apparatus may be characterized in that it further comprises second identifier generating means for generating an identifier uniquely specifying the document data or part thereof, based on all or part of the document data, prior to execution of the canonicalization process by the canonicalization process means, and in that identity between one document data and another document data is determined on the basis of the identifier having been generated by the second identifier generating means, and if they are determined not to be identical, the canonicalization process means performs the canonicalization process of the document data.

Another identity determining method (identity determining apparatus) according to the present invention comprises an identifier generating step (identifier generating means) of, based on all or part of encoded data of document data, generating an identifier uniquely specifying the document data or part thereof; and an identity determining step (identity determining means) of determining whether there exists a common portion between one document data and another document data, based on the identifier having been generated in the identifier generating step (by the identifier generating means).

The above identity determining method (identity determining apparatus) may be characterized in that an instruction to skip a process of decoding the encoded data of the document data is issued when the identity determining step (identity determining means) results in determining that the two document data are identical.

An identifier transmitting method (identifier transmitting apparatus) according to the present invention comprises a canonicalization process step (canonicalization process means) of subjecting document data to a canonicalization process to correct fluctuation of expression; an identifier generating step (identifier generating means) of generating an identifier uniquely specifying the document data or part thereof, based on all or part of the document data having been subjected to the canonicalization process in the canonicalization process step (by the canonicalization process means); and an identifier transmitting step (identifier transmitting means) of transmitting the identifier having been generated in the identifier generating step (by the identifier generating means).

The above identifier transmitting method (identifier transmitting apparatus) may be characterized in that the identifier transmitting step (identifier transmitting means) comprises a transmitted data generating step (transmitted data generating means) of generating data obtained by replacing all or part of the document data by the identifier.

The above identifier transmitting method (identifier transmitting apparatus) may be characterized in that the transmitted data generating step (transmitted data generating means) is configured to generate transmitted data described by an identifier uniquely specifying partial data included in the document data, and difference data between the partial data and the document data.

(Action)

In order to solve the aforementioned problem, the present invention involves execution of the canonicalization process to correct the fluctuation of expression, prior to generation of the identifier for an XML document or RDF document. The canonicalization process typified by XML-Canonicalization is a process of correcting the fluctuation of expression permitted by the XML Specification, including deletion of redundant white spaces, recovery from omission of a close tag, and so on. The canonicalization process results in canonicalizing XML documents or RDF documents with the same meaning into documents described in the same expression and thus permits an identical identifier to be generated for the documents, by a function of generating an identifier from a sequence of characters, typified by the one-way function.

Here, with reference to the class definition file of XML documents or RDF documents, types of data described in the XML documents or RDF documents may be standardized. The type standardization process standardizes accuracies or the like of Double type or Float type numerals and also converts the XML documents or RDF documents with the same meaning into documents described in the same expression, similarly as in the canonicalization process. It also permits an identical identifier to be generated for the documents, by a function of generating an identifier from a sequence of characters, typified by the one-way function.

The present invention may also be implemented as follows: for describing document data from default data and difference data according to the CC/PP Specification, reference is made to multiple partial data to acquire partial data for document data expressing the meaning of the original document data, the partial data is transformed according to a certain transformation rule to generate original document data, and then an identifier is generated therefor. Since the original document data is generated prior to the generation of the identifier, XML documents or RDF documents with the same meaning are changed to documents in the same expression, and an identical identifier can be generated for the documents, by a function of generating an identifier from a sequence of characters, typified by the one-way function.

Here, the identifier may be generated after execution of a process of rearranging the sequence of constituent elements of document data in accordance with a predetermined rule.

When the present invention involves either of the above processes prior to the generation of the identifier, the identical identifier may be generated for the XML documents or RDF documents with the same meaning.

The present invention also permits identity of multiple XML documents or RDF documents to be determined using the identifier generated by the above generating technique. In the identity determining method (identity determining apparatus) according to the present invention, the identity determining step (identity determining means) is configured to determine whether there exists a common portion between one document data and another document data. Namely, a determination can be made on the following cases: 1) whether part of one document data is identical with part of another document data; 2) whether one document data is identical with part of another document data; 3) whether part of one document data is identical with another document data; 4) whether one document data is identical with another document data.

Here, the canonicalization process and the type standardization process may be arranged in a step-by-step manner, and after execution of each process, the identifier is generated and identity is determined based thereon. When each identity determining process results in determining that documents in question are identical, processing may be directly terminated without transfer to the next stage, so as to decrease the processing time for the identity determination.

In the present invention, the identity of an XML document can be determined using the identifier uniquely generated from all or part of encoded data of the XML document. Since the encoding of the XML document results in assigning expressions with the same meaning, a code preliminarily uniquely defined according to a code transformation rule (reference should be made to ISO/IEC 15938 Part 1 Systems Binary format-BiM), the encoded data is in a state in which the fluctuation of expression is corrected. Namely, XML documents with the same meaning are encoded into identical encoded data, and the identifier is generated from the encoded data as a sequence of characters by the one-way function or the like, whereby the identity determination can be made on the XML documents with the same meaning.

The present invention enables multiple XML documents, RDF documents, or portions thereof with the same meaning to be identified, and thus simplifies processing of XML documents, RDF documents, or portions thereof having been processed in the past, so as to reduce the processing time at terminals or servers. The present invention permits the identifier to be uniquely generated for an XML document, an RDF document, or a portion thereof, so that it can be utilized as compression of data of documents. Furthermore, similar to the identification, it can also simplify the processing of XML documents or RDF documents at terminals or servers.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 10 is a block diagram showing the configuration of the identity determining apparatus according to another embodiment.

FIG. 11 is a diagram showing a case of an XML document as an example of input document data.

FIG. 12 is a diagram showing an example of data after the canonicalization of document data shown in FIG. 11, according to XML-Canonicalization Specification.

FIG. 13 is a diagram showing an example of document data identifiers and document data URIs stored in the cache.

FIGS. 14A to 14C are diagrams showing (A) document data 1 before the transformation of target document data, (B) document data 2 before the transformation of target document data, and (C) an example of the class definition file.

FIGS. 15A and 15B are diagrams showing examples of document data after the transformation of target document data.

FIGS. 18A and 18B are diagrams showing (A) an example of default data, and (B) an example of an RDF document as target document data.

FIG. 19 is a diagram showing document data after the transformation in document data generating step S401.

FIG. 20 is a block diagram showing the configuration of the identifier transmitting apparatus according to another embodiment.

FIG. 22 is a diagram showing an example of document data transmitted by the identifier transmitting method according to another embodiment.

DESCRIPTION OF THE PREFERRED EMBODIMENTS

[First Embodiment]

Figure 1:
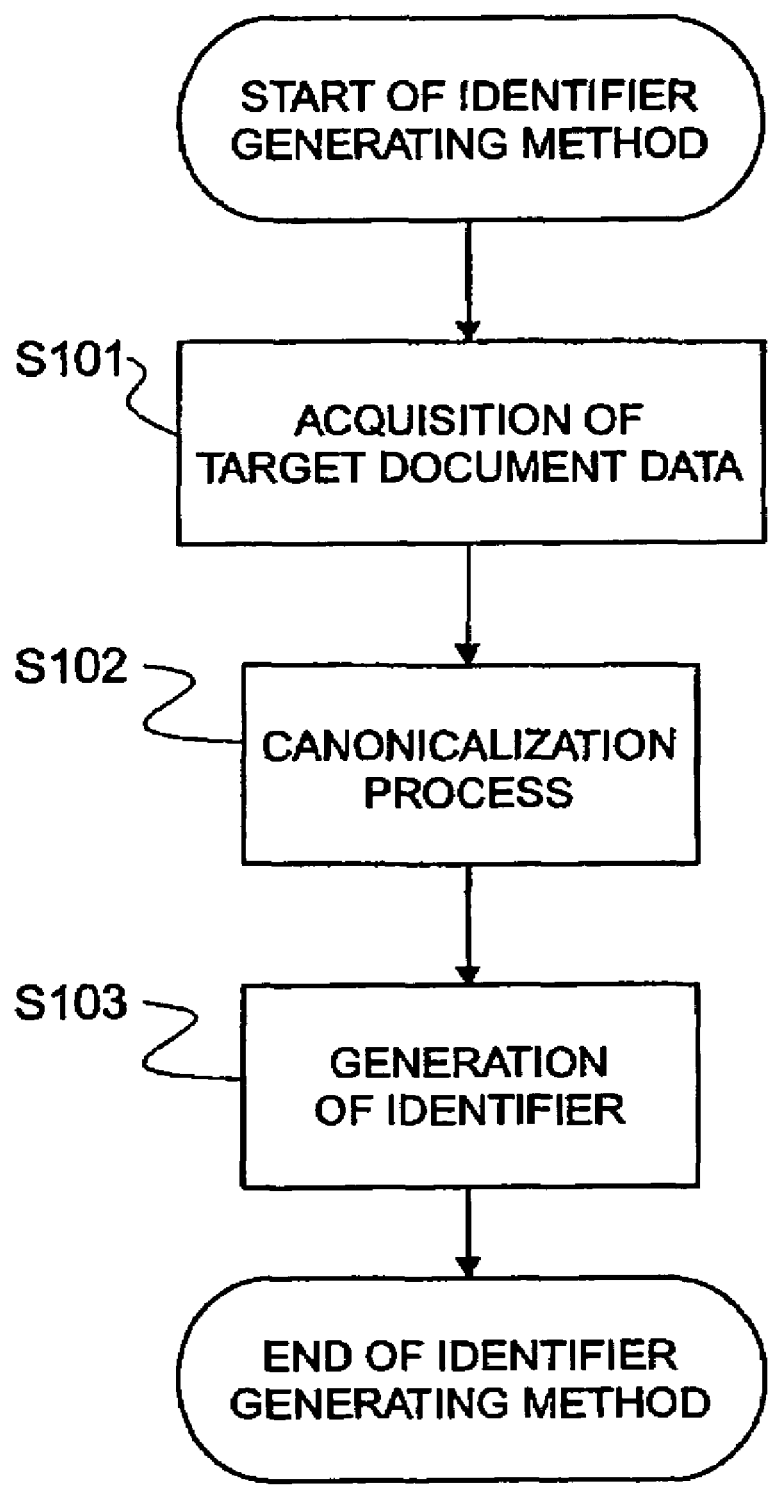
FIG. 1 is a flowchart showing the operation of the identifier generating method according to an embodiment.

The first embodiment of the present invention will be described below with reference to the drawings. FIG. 1 is a flowchart showing the operation of the identifier generating method according to the present embodiment.

As shown in the figure, the identifier generating method is comprised of target document data acquiring step S101 of acquiring document data being a target for generation of an identifier; canonicalization process step S102 of correcting fluctuation of expression of the target document data; and identifier generating step S103 of generating a unique identifier from the entire target document data or a selected range thereof.

FIG. 11 is a diagram showing a case of an XML document as an example of input document data. As shown in the figure, the input document data includes unnecessary white spaces and omission of a close tag. Canonicalization needs to be carried out prior to generation of the identifier, in order to prevent a different identifier from being generated because of the fluctuation of expression due to the describer.

FIG. 12 is an example of canonicalized data according to the XML-Canonicalization Specification from the document data shown in FIG. 11. As shown in the figure, the document data after the canonicalization process is free of the fluctuation of expression due to the describer, as a result of deletion of unnecessary white spaces and insertion of a close tag. An identifier is generated based on the document data shown in the figure.

In the identifier generating step S103, a unique identifier is generated from the entire document data or a selected range thereof after the canonicalization process. For example, using a one-way function such as a hash function, the hash value is generated as an identifier. However, the function for generation of the identifier does not always have to be the one-way function, but may be any function that can generate a unique identifier.

Figure 2:
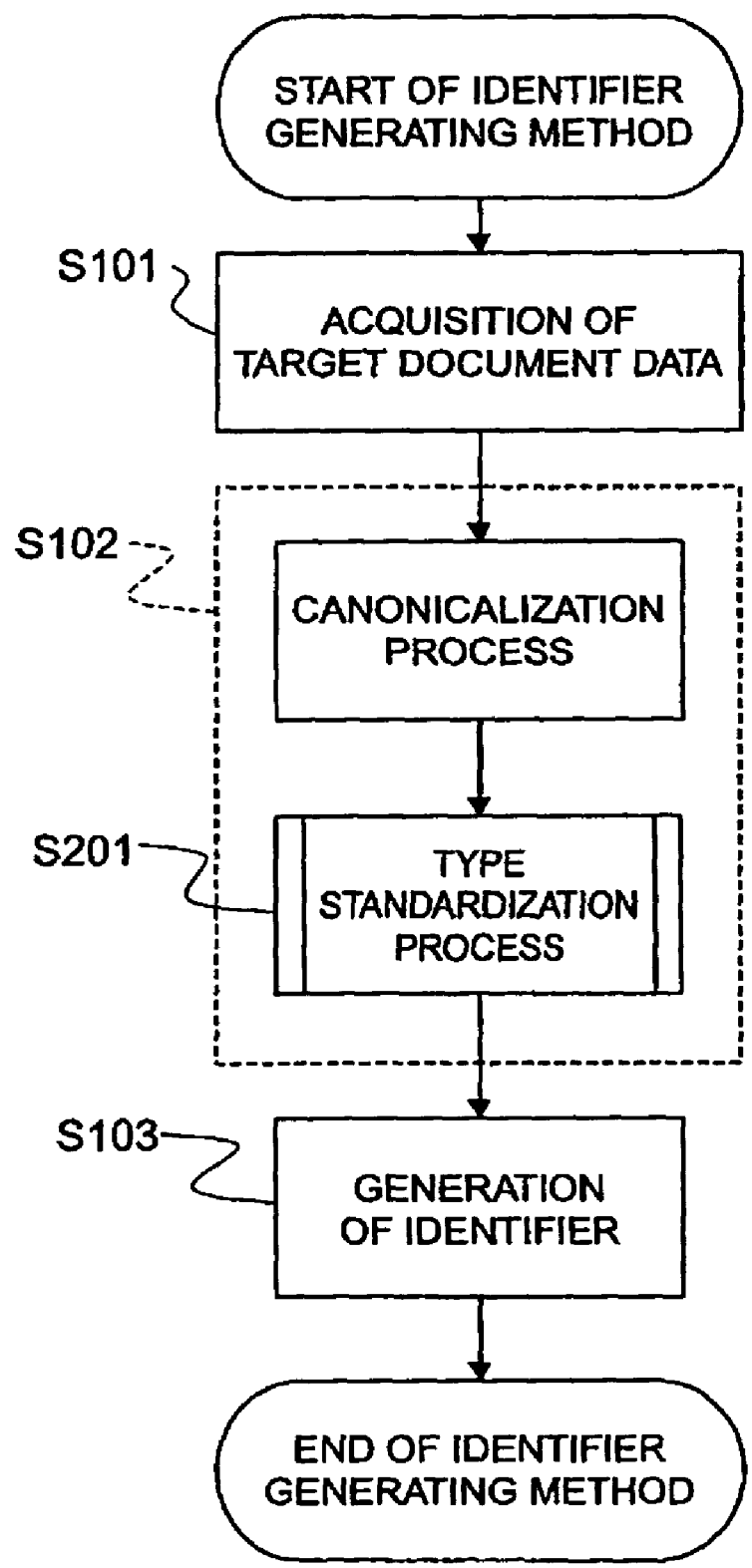
FIG. 2 is a flowchart showing the operation of the identifier generating method according to another embodiment.

FIG. 2 is a flowchart showing the operation of the identifier generating method in which the canonicalization process step S102 includes additional type standardization process step S201 of confirming a class definition file of the target document data and standardizing the type thereof.

Figure 3:
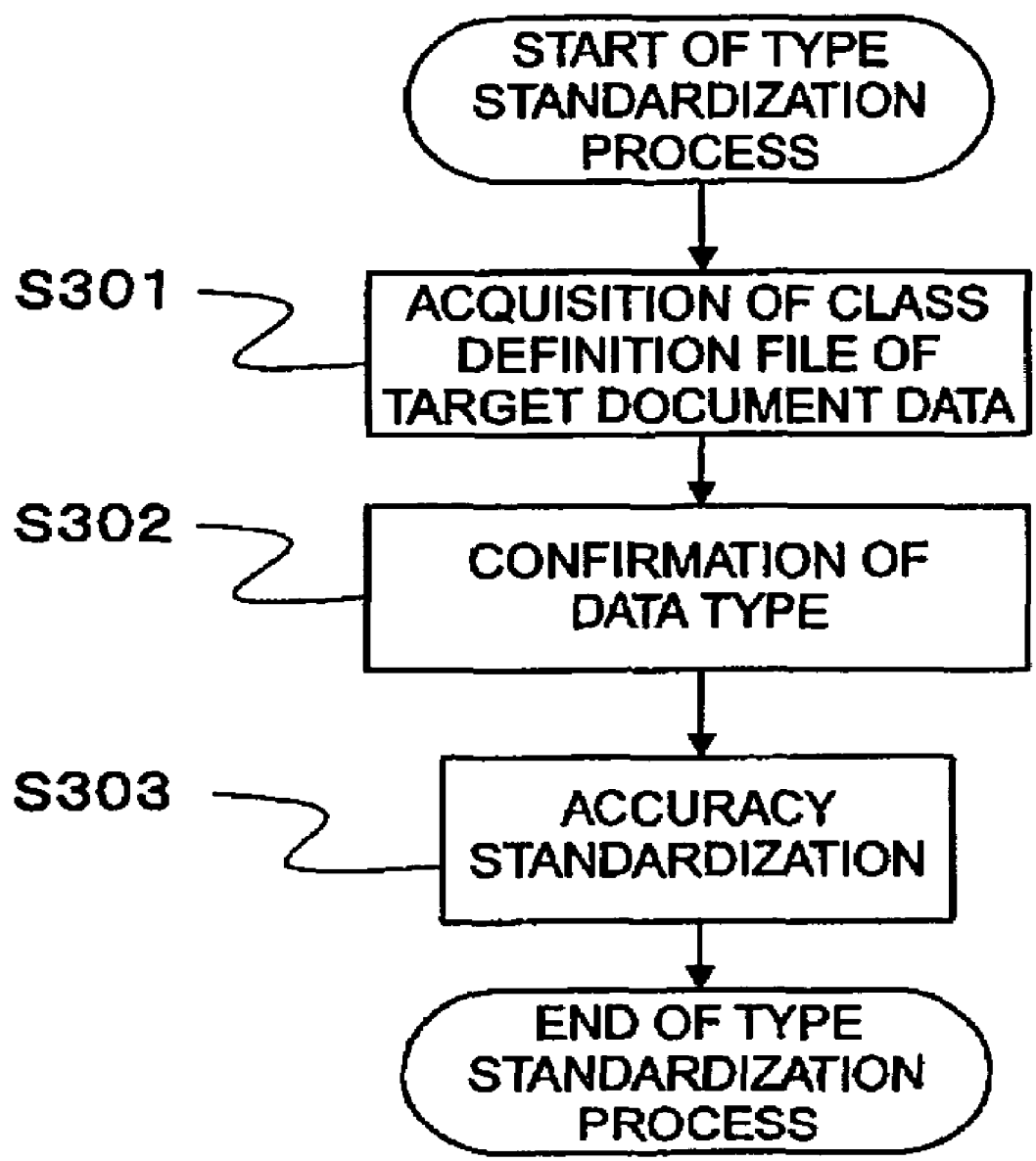
FIG. 3 is a flowchart showing the details of the operation of type standardization process step S201.

FIG. 3 is a flowchart showing the details of the operation of type standardization process step S201. As shown in the figure, the type standardization process is comprised of step S301 of acquiring a class definition file of the target document data; data type confirming step S302 of confirming a type of every data described in the target document data, based on the class definition file; and document data transforming step S303 of transforming the target document data according to the class definition file.

The document data transforming step S303 is configured to transform the data according to the data type described in the class definition file, which was confirmed in the data type confirming step S302. FIG. 14A and FIG. 14B are diagrams showing document data before the transformation of target document data, and FIG. 14C is a diagram showing an example of the class definition file. As shown in the figure, the class definition file includes the description of <ElementType name="value" dt:type="double"/>, which confirms that the type of element value of "value" is the "double" type. It is also seen that Document Data 1 shown in FIG. 14A and Document Data 2 shown in FIG. 14B include the description of 12.0 and 12.00, respectively, of the double type, as element values of "value." Although the both documents are described along the type definition, they are different in the form of sequences of characters.

FIG. 15A and FIG. 15B are examples of document data after the transformation of the target document data. As shown in these figures, the accuracy of the element values of "value" defined in the "double" type is made equivalent to the accuracy of "double," whereby the element values, 12.0 and 12.00, of "value" in Document Data 1 and Document Data 2 shown in FIGS. 14A and 14B become equal to each other. This process standardizes the type and equalizes the documents in the form of sequences of characters as well.

Figure 4:
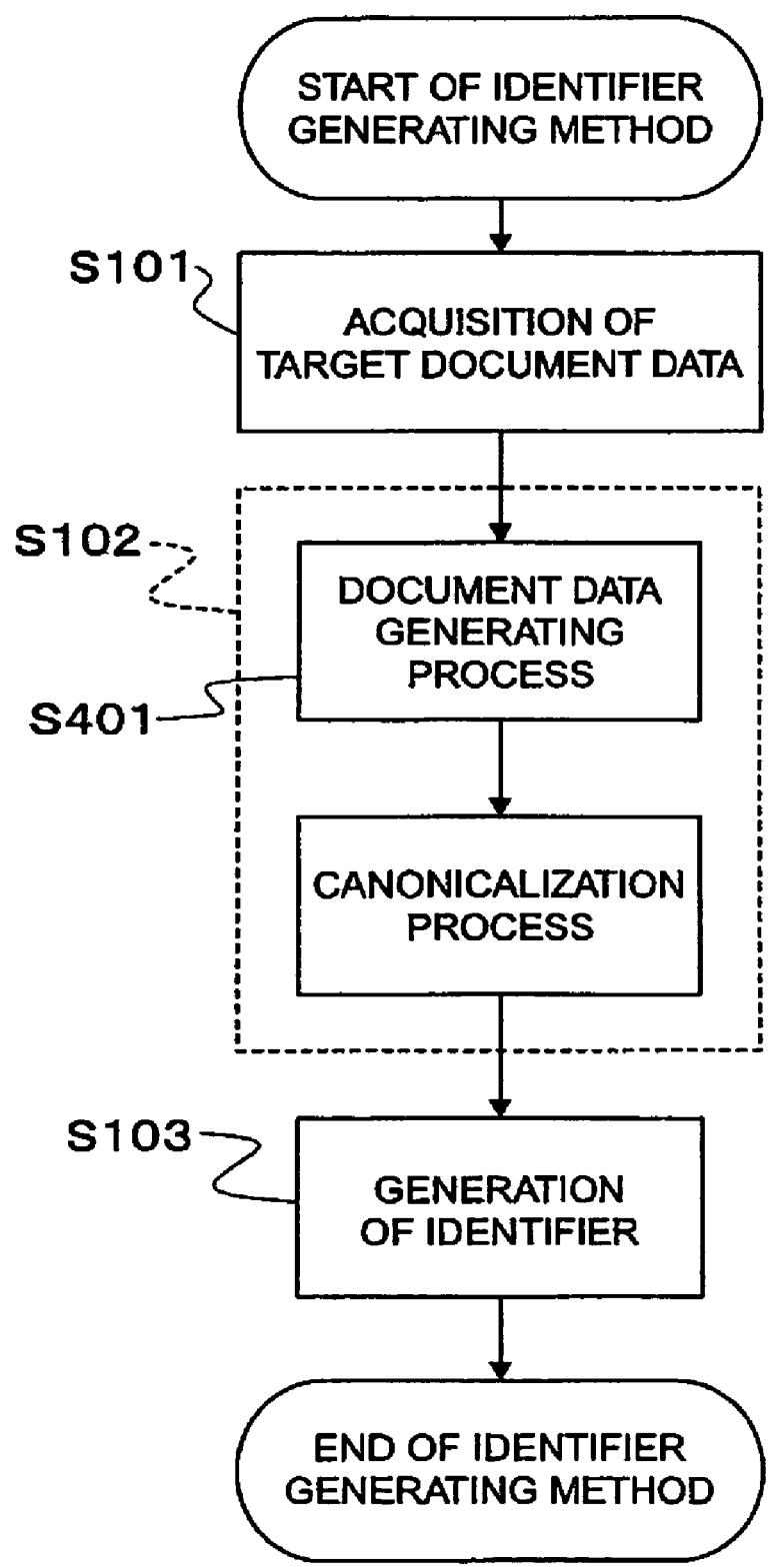
FIG. 4 is a flowchart showing the operation of the identifier generating method according to another embodiment.

FIG. 4 is a flowchart showing the operation of the identifier generating method in which, where the target document data is composed of default data and difference data, canonicalization process step S102 includes additional document data generating step S401 of generating the original document data from the default data and difference data.

FIG. 18A is a diagram showing an example of the default data. As shown in the figure, the following is defined as default (see lines 10 and 11).

<up:role>guest</up:role>

<up:age>16<up:age>

FIG. 18B is a diagram showing an example of an RDF document as target document data. As shown in the figure, the RDF document is doubly defined and includes the description of an URI of default data (<ccpp:defaults rdf:resource="UserProfileDefault"></ccpp:defaults>) and the difference data (<up:role>vip<up:role>) (see lines 12 and 13). This RDF document is transformed into the original document data in the document data generating step S401. FIG. 19 is document data after the transformation in the document data generating step S401. The figure shows the case where the difference data was overwritten over the default data. As shown in the figure, the default data is acquired from the URI of the default data, and the difference data is overwritten to transform <up:role>guest</up:role> to <up:role>vip</up:role> (see line 12), thereby obtaining the original document data.

Figure 26:
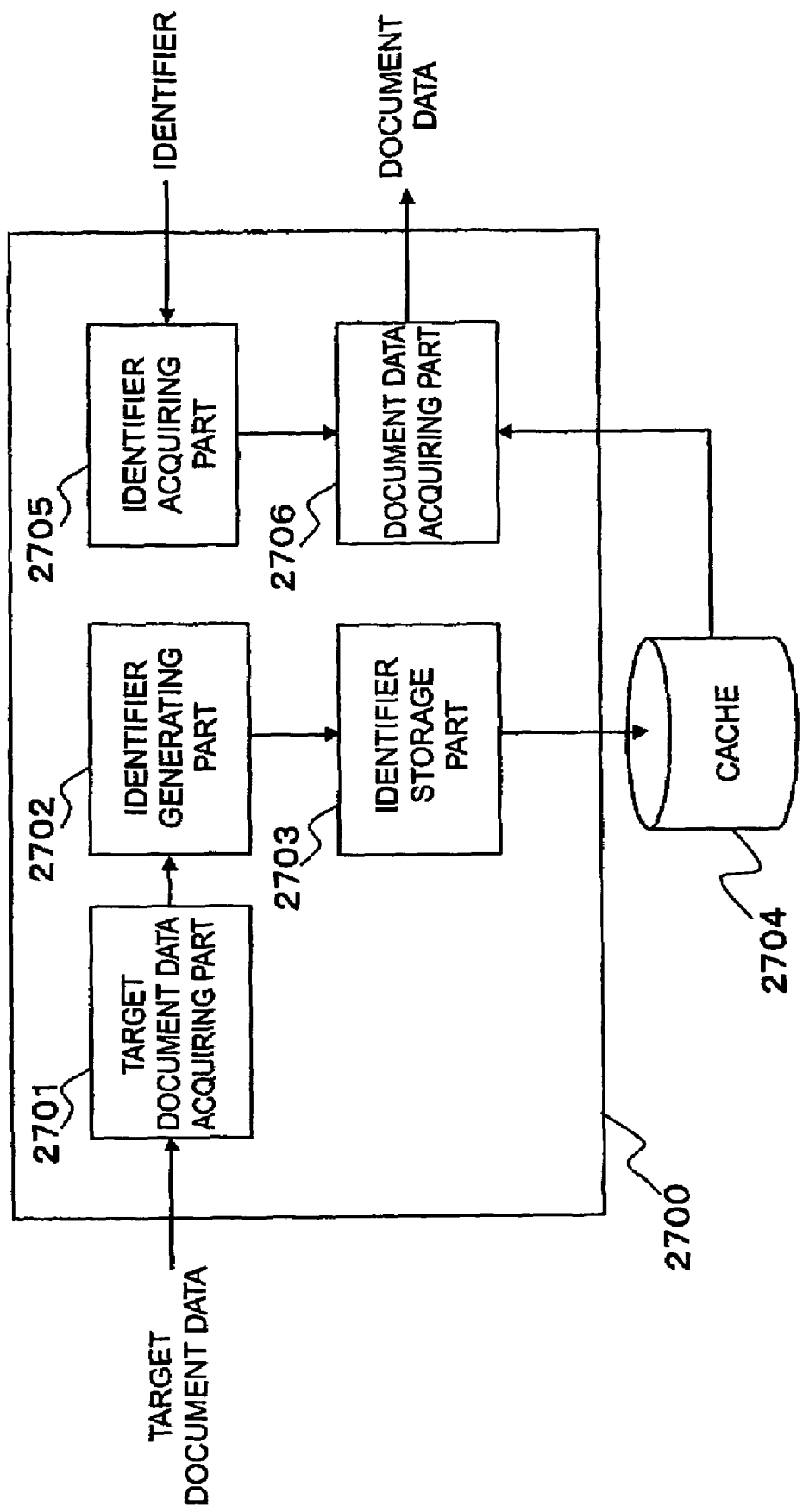
FIG. 26 is a block diagram showing the configuration of the document data storing-acquiring system.

FIG. 26 is a block diagram showing a configuration of document data storing-acquiring system 2700 capable of storing target document data along with the identifier thereof into a cache by the identifier generating method of the present embodiment and acquiring the target document data later on from the cache, using the identifier. As shown in the figure, the document data storing-acquiring system 2700 is comprised of target document data acquiring part 2701 for acquiring target document data; identifier generating part 2702 with the identifier generating method of the present embodiment being mounted thereon; identifier storing part 2703 for storing the generated identifier with the target document data into cache 2704; identifier acquiring part 2705 for acquiring an identifier of document data desired to be acquired from the cache 2704; and document data acquiring part 2706 for acquiring the document data from the cache, using the identifier.

FIG. 13 shows an example of document data identifiers and document data URIs stored into cache 2704 by identifier storing part 2703. As shown in the figure, it becomes feasible to manage the input document data, using their identifiers. If an identifier is one already stored in the cache, it is also possible to discard the document data without storing it.

Figure 21:
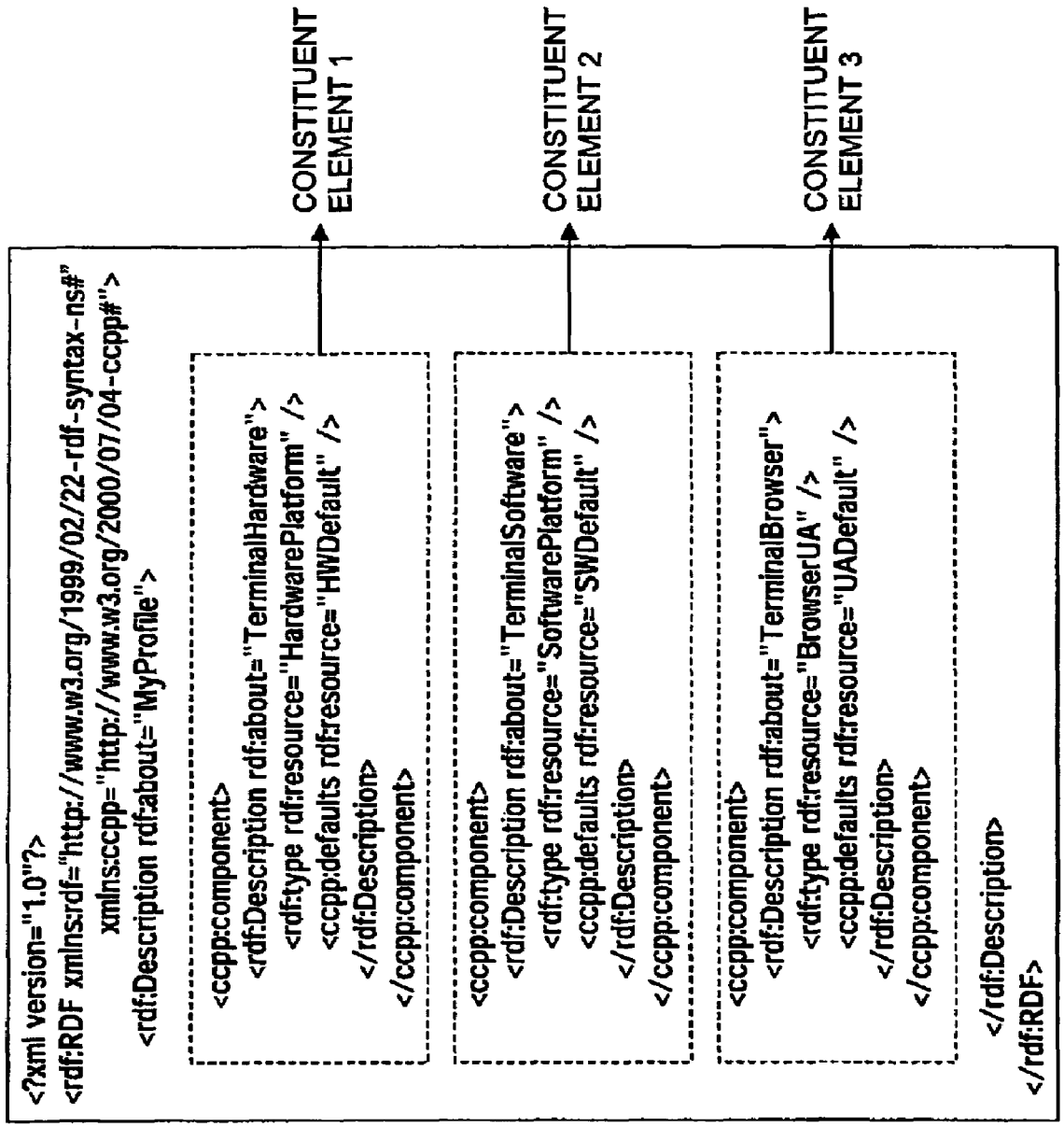
FIG. 21 is a diagram showing an example of document data consisting of a plurality of constituent elements.
Figure 27:
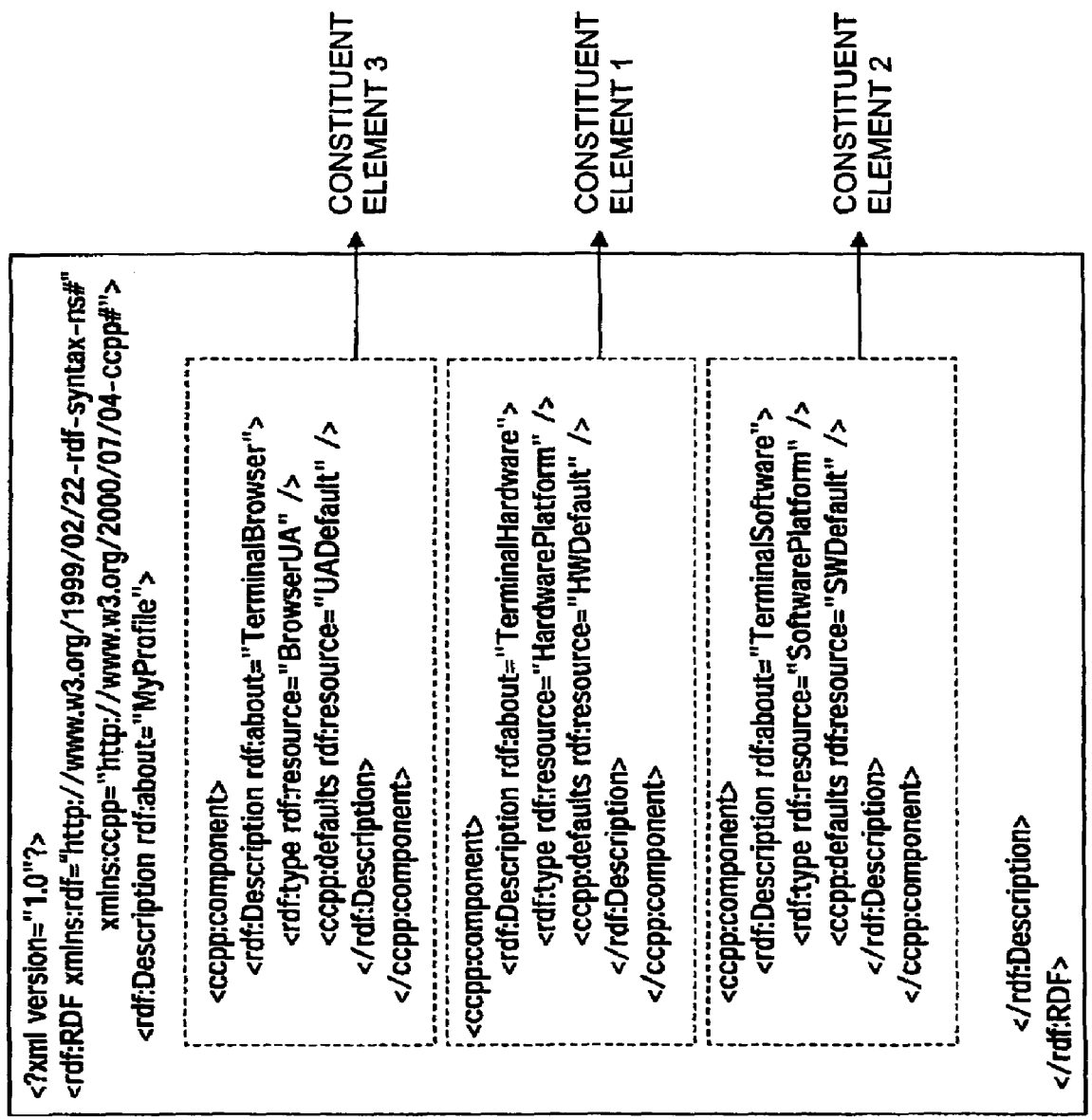
FIG. 27 is a diagram showing document data after rearrangement of the sequence of constituent elements in the alphabetical order.

The canonicalization process step S102 shown in FIGS. 1, 2, and 4 may also be modified so as to change the sequence of constituent elements in the document data according to a predetermined rule. For example, supposing the input data is document data consisting of multiple constituent elements as shown in FIG. 21, the sequence of constituent elements is rearranged so as to arrange portions of xxxx in <rdf:Description rdf:about="xxxx"> in the alphabetical order. FIG. 27 shows document data after the rearrangement of the sequence of constituent elements in the alphabetical order. According to the RDF Specification, the document data can be assumed to have the same meaning in total, regardless of the sequence of the constituent elements in the document data. Namely, even documents identical in meaning can be those different in the sequence of constituent elements. Therefore, by changing the sequence of constituent elements according to the predetermined rule and thereafter generating the identifier, it becomes feasible to generate an identical identifier for multiple document data different in the sequence of constituent elements but identical in meaning.

[Second Embodiment]

Figure 5:
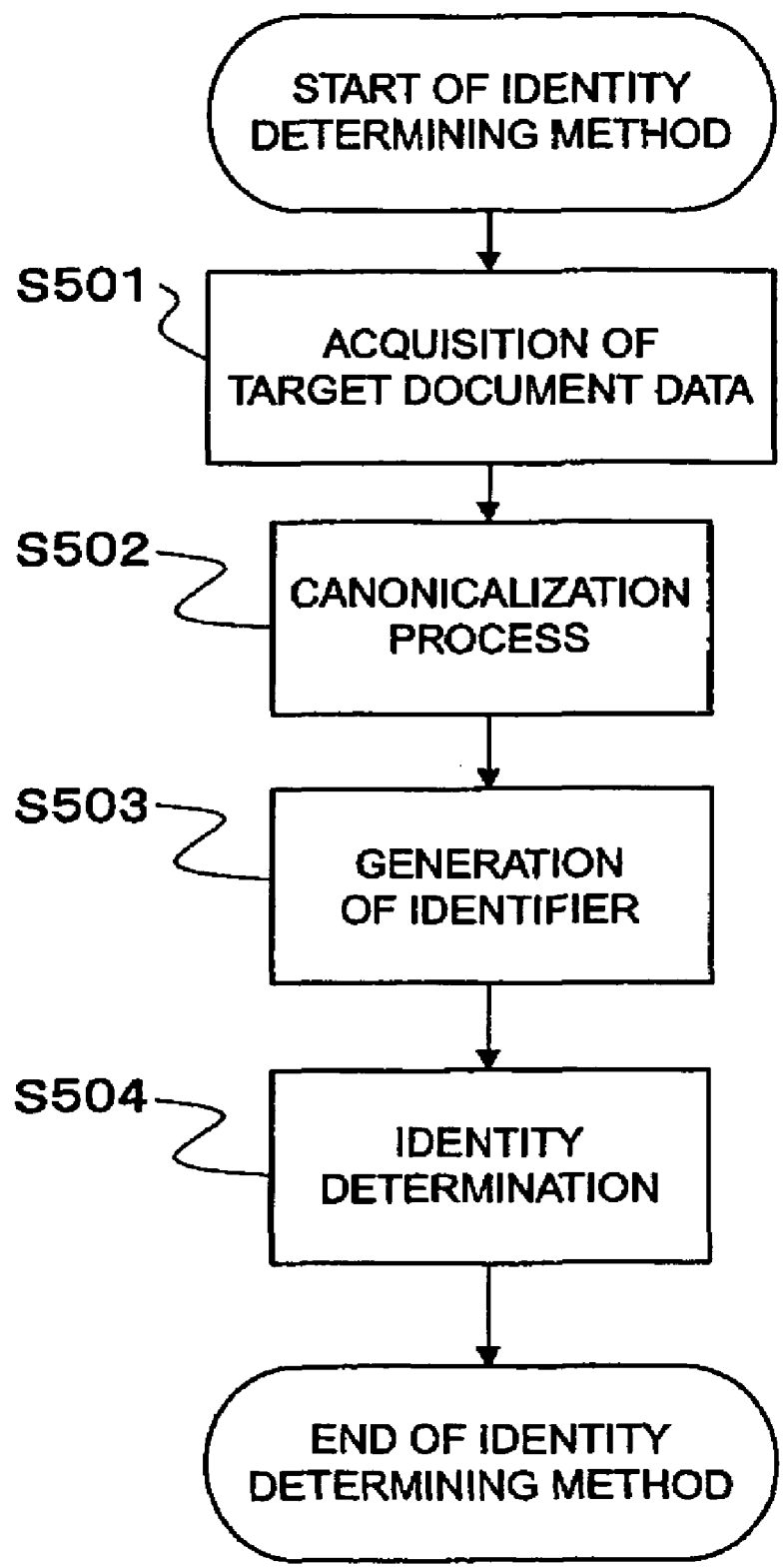
FIG. 5 is a flowchart showing the operation of the identity determining method according to another embodiment.

The second embodiment of the present invention will be described below with reference to the drawings. FIG. 5 is a flowchart showing the operation of the identity determining method according to the present embodiment.

As shown in the figure, the identity determining method is comprised of target document data acquiring step S501 of acquiring document data as a target for a determination on identity; canonicalization process step S502 of correcting fluctuation of expression for the target document data; identifier generating step S503 of generating a unique identifier from the entire target document data or a selected range thereof; and identity determining step S504 of determining identity of multiple document data on the basis of the identifier generated in the identifier generating step S503.

FIG. 11 and FIG. 12 show the examples of the document data before the canonicalization process and the document data after the canonicalization process. It is seen from these figures that the canonicalization process corrects the fluctuation of expression.

Figure 6:
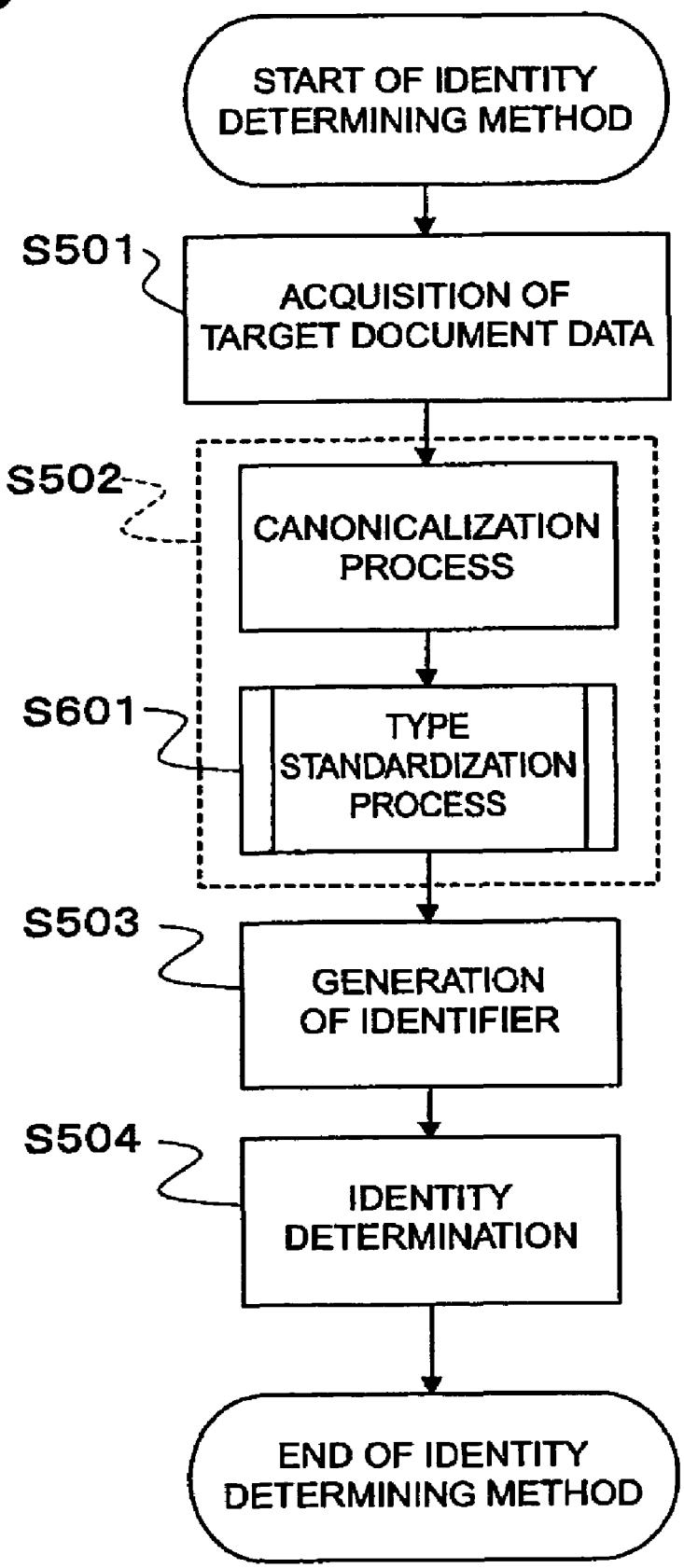
FIG. 6 is a flowchart showing the operation of the identity determining method according to another embodiment.

FIG. 6 is a flowchart showing the operation of the identity determining method in which the canonicalization process step S502 includes type standardization process step S601 of confirming the class definition file of the target document data and standardizing the type thereof.

FIG. 3 is a flowchart showing the details of the operation of type standardization process step S601. The details of the operation are the same as in the first embodiment.

FIGS. 14A and 14B are diagrams showing Document Data 1 and Document Data 2, respectively, before the type standardization process, FIG. 14C a diagram showing an example of the class definition file, and FIGS. 15A and 15B diagrams showing examples of Document Data 1 and Document Data 2, respectively, after the type standardization process. It is seen from these figures that the values in "value" expressed in different expressions are changed into one in the same expression by the type standardization step S601.

Figure 7:
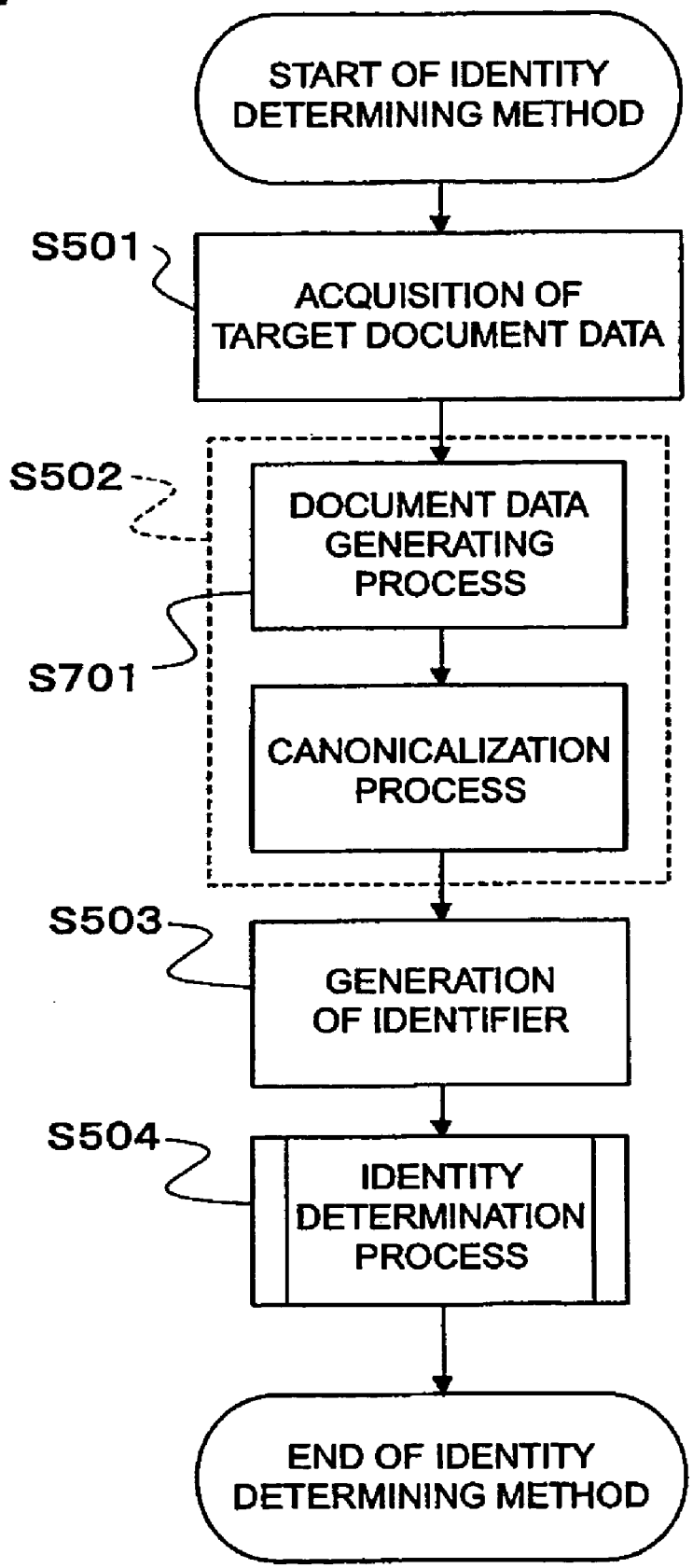
FIG. 7 is a flowchart showing the operation of the identity determining method according to another embodiment.

FIG. 7 is a flowchart showing the operation of the identity determining method in which, where the target document data consists of default data and difference data, the canonicalization process step S502 includes additional document data generating step S701 of generating the original document data from the default data and the difference data.

FIGS. 18A and 18B show the examples of the default data and target document data, and FIG. 19 the example of the document data after the transformation, which was generated in the document data generating step S701. The details of the operation are the same as in the first embodiment.

Figure 8:
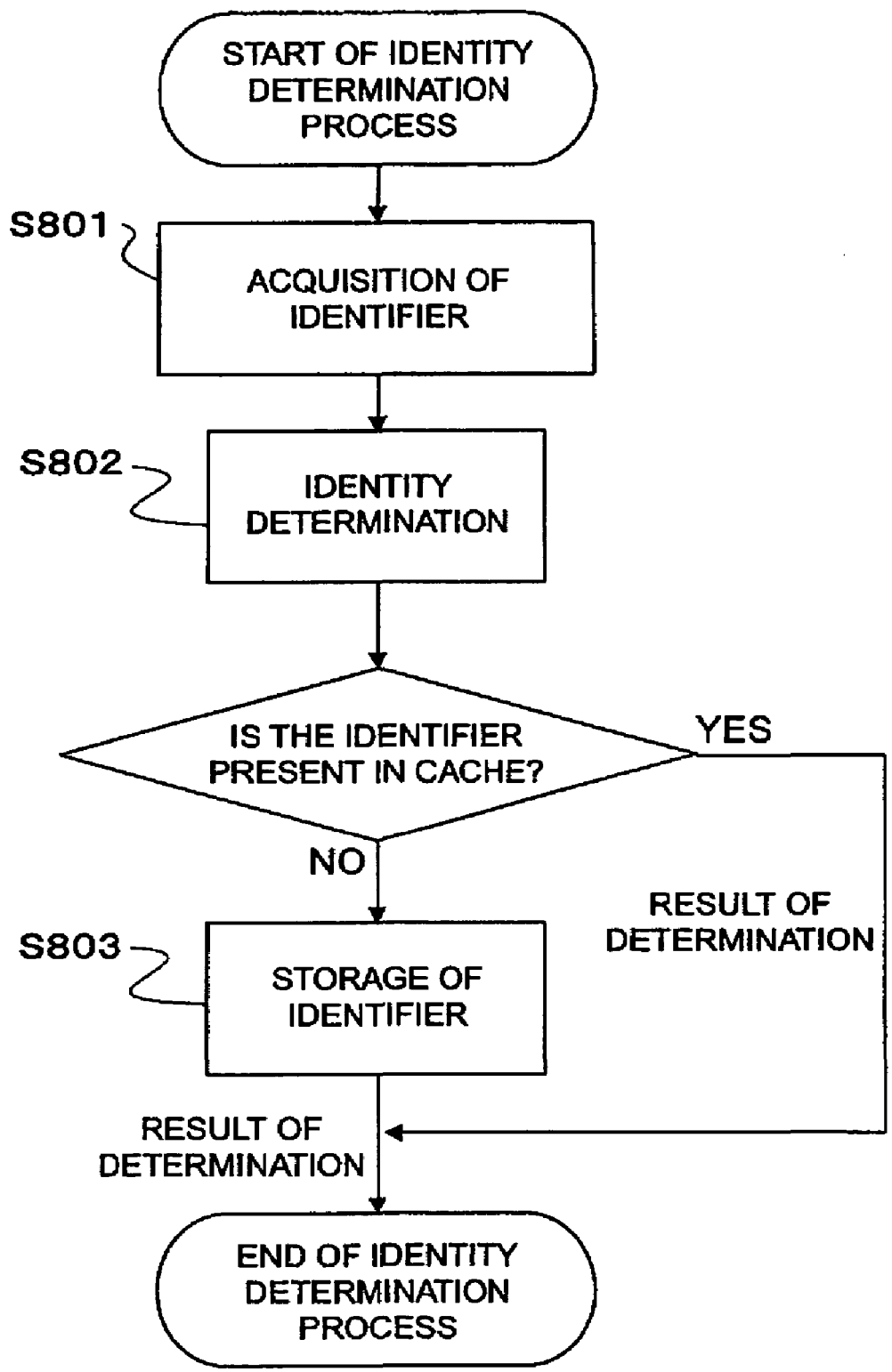
FIG. 8 is a flowchart showing the operation of the identity determining method according to another embodiment.

FIG. 8 is a flowchart showing the details of the operation of identity determining step S504. As shown in the figure, the identity determining step S504 is comprised of identifier acquiring step S801 of acquiring an identifier generated from target document data as a target for a determination on identity; identifier storing step S803 of storing the identifier into a cache; and identity determining step S802 of searching the cache for the identifier, determining with a success in the search that the same document data is present, and determining with a failure in the search that the same document data is absent. When the identifier is absent in the cache, the identifier is transferred to the identifier storing step S803 to be stored into the cache.

FIG. 10 is a block diagram showing a configuration of identity determining apparatus 1101 for determining whether input document data is one already processed, by the identity determining method according to the present embodiment. As shown in the figure, the identity determining apparatus 1101 is comprised of target document data acquiring part 1102 for acquiring target document data; identifier generating part 1103 for generating an identifier from the target document data; identity determining part 1108 for determining whether the data is one already processed, using the generated identifier and cache 1110; and identifier storing part 1109 for, when the identity determining part determines that the data is not one already processed, storing the identifier into the cache 1110, for the next identity determination. The identifier generating part 1103 is comprised of document data generating part 1104 for generating the original document data from the default data and difference data; canonicalization process part 1105 for carrying out the canonicalization process to correct the fluctuation of expression; type standardization process part 1106 for carrying out the type standardization process of data, using the class definition file; and identifier generation process part 1107 for generating a unique identifier from the target document data.

Figure 16:
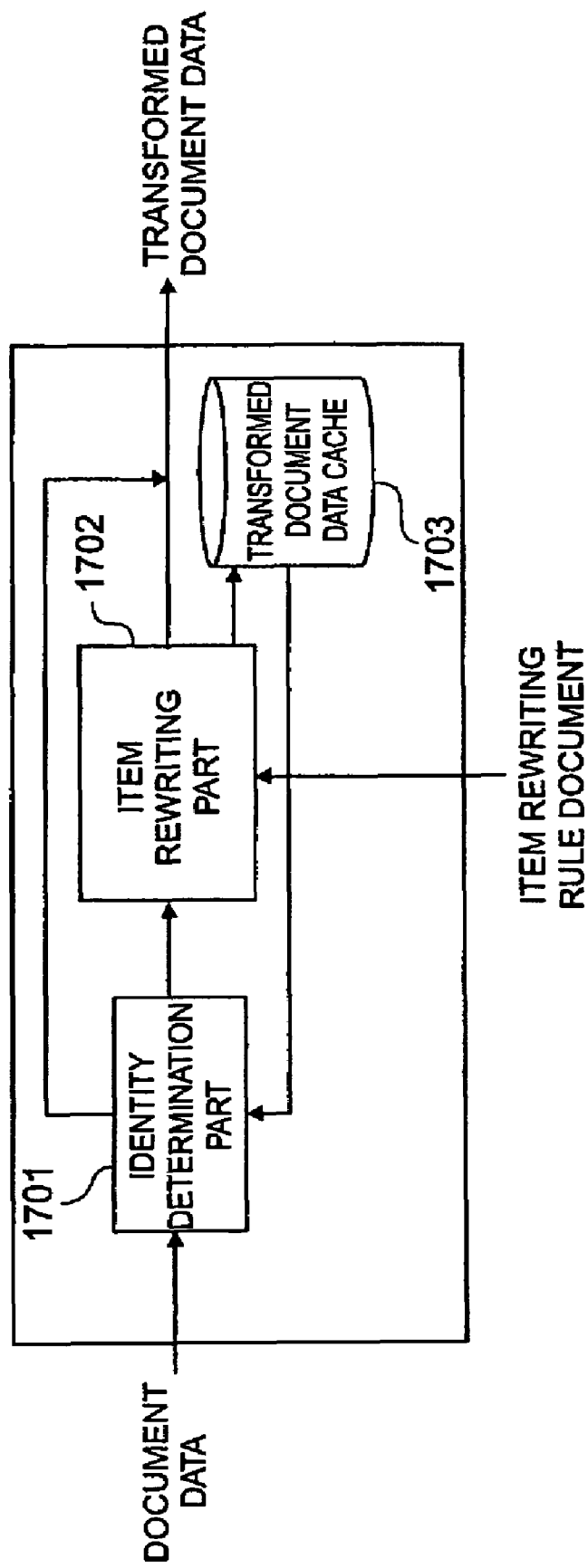
FIG. 16 is a block diagram showing the configuration of the item rewriting process apparatus.

FIG. 16 is a block diagram showing a configuration of an item rewriting process apparatus for skipping an item rewriting process of document data if the input data is document data already processed, using the identity determining method according to the present embodiment. As shown in the figure, the apparatus is composed of identity determining part 1701 with the identity determining method of the present embodiment being mounted thereon; item rewriting part 1702 for rewriting items of document data in accordance with an item rewriting rule document; and transformed document data cache 1703 storing transformed document data generated by the item rewriting part 1702, along with the identifiers of the document data generated by the identity determining part 1701.

The identity determining part 1701 generates an identifier after receiving input document data. It determines whether the input data is document data already having been subjected to item rewriting, using the generated identifier and transformed document data cache 1703. When the input data is document data already having been subjected to item rewriting, the process at the item rewriting part 1702 is skipped and output data is transformed document data that can be acquired using the identifier present in the transformed document data cache. Since the present invention enables the skipping of the item rewriting process, which generally takes a long processing time, it becomes feasible to implement fast processing.

[Third Embodiment]

Figure 9:
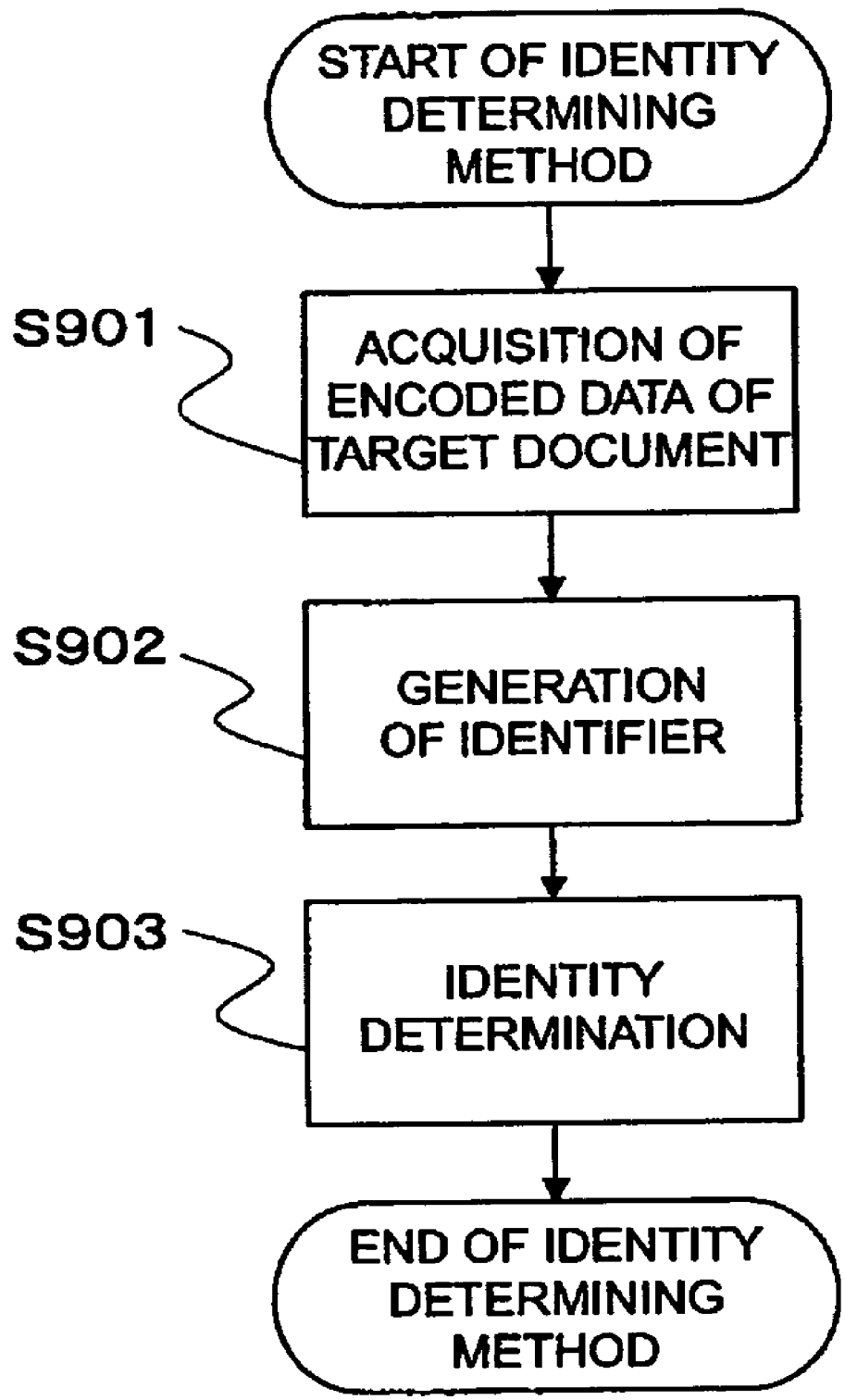
FIG. 9 is a flowchart showing the operation of the identity determining method according to another embodiment.

The third embodiment of the present invention will be described below with reference to the drawings. FIG. 9 is a flowchart showing the operation of the identity determining method according to the present embodiment.

As shown in the figure, the identity determining method is comprised of encoded data acquiring step S901 of acquiring encoded data of document data as a target for a determination on identity; identifier generating step S902 of generating an identifier from all or part of the acquired encoded data; and identity determining step S903 of determining identity of multiple document data on the basis of the identifier generated in the identifier generating step S902.

Since the XML encoding assigns expressions with the same meaning a code preliminarily uniquely defined according to the code transformation rule, the encoded data is in a state in which the fluctuation of expression is corrected. Namely, identical encoded data is generated from XML documents with the same meaning; therefore, by generating the identifier according to the one-way function or the like from the encoded data as a sequence of characters, it becomes feasible to make a determination on identity of XML documents with the same meaning.

Figure 25:
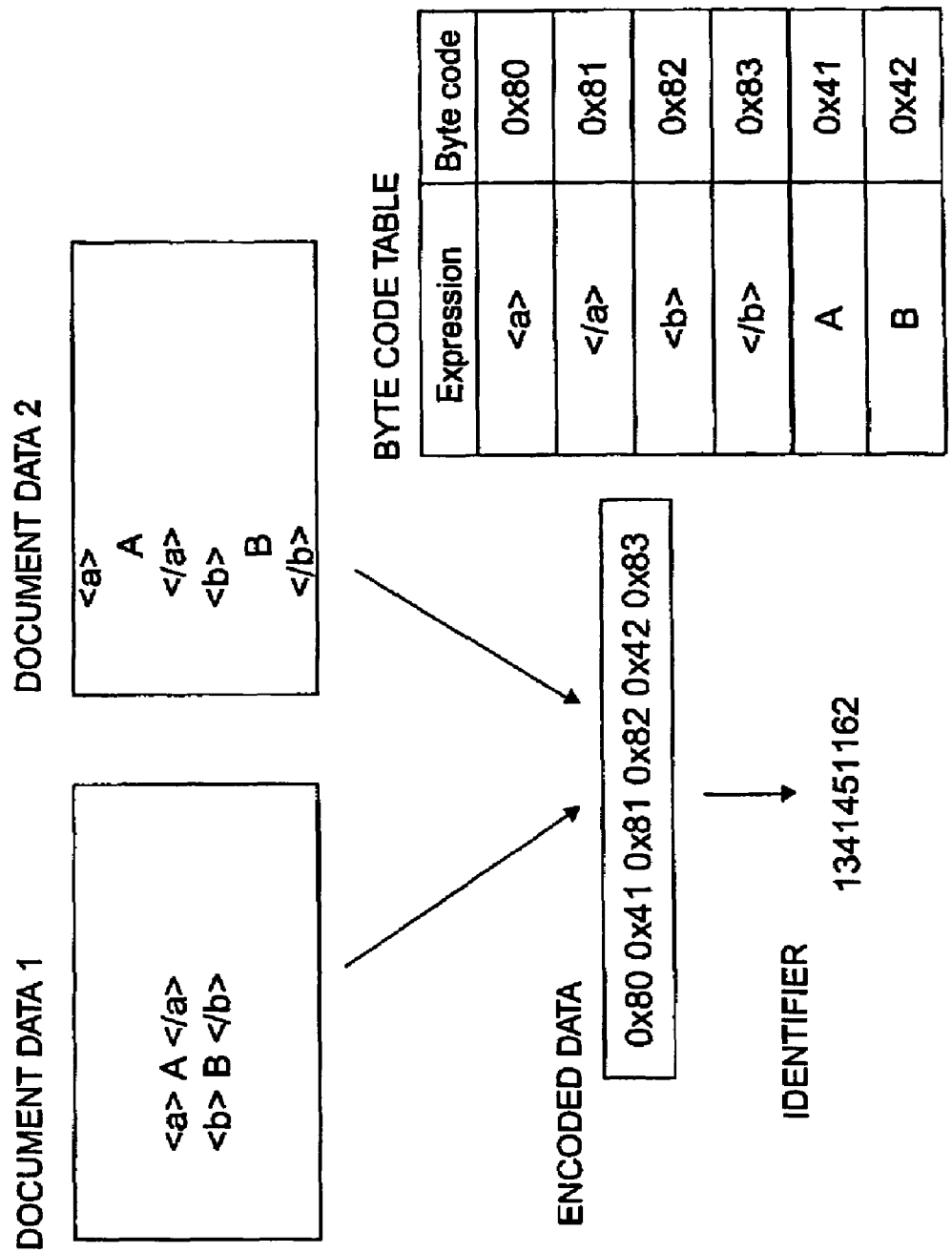
FIG. 25 is a diagram for explaining encoded data.

FIG. 25 is a diagram showing an example in which Document Data 1 and Document Data 2, which are documents identical in meaning but different in the sequence of characters, are encoded according to a byte code table to generate identical encoded data. As shown in the figure, the identical encoded data is obtained by encoding Document Data 1 and Document Data 2 with the same meaning, which are different only in insertion of line feeds. When an identifier is generated based on this encoded data, the same identifier can be generated for the multiple document data with the same meaning.

In FIG. 16, the input document data is encoded data resulting from data compression of an XML document. When encoded data is supplied, a decoding process is generally essential to processing thereof. However, the use of the identity determining method according to the present embodiment permits the identity determination in a state of the encoded data and thus also permits the skipping of the decoding process for the document data already processed.

[Fourth Embodiment]

Figure 17:
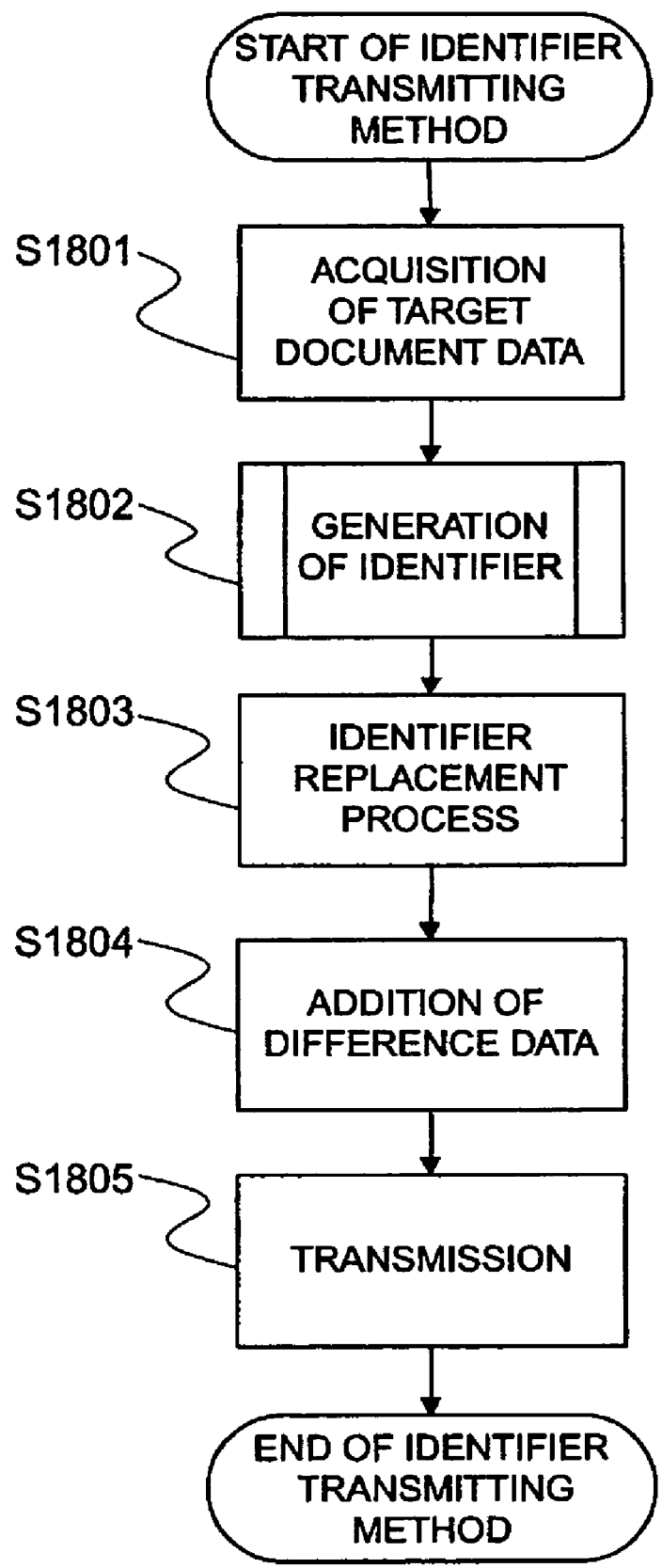
FIG. 17 is a flowchart showing the operation of the identifier transmitting method according to another embodiment.

The fourth embodiment of the present invention will be described below with reference to the drawings. FIG. 17 is a flowchart showing the operation of the identifier transmitting method according to the present embodiment.

As shown in the figure, the identifier transmitting method is comprised of target document data acquiring step S1801 of acquiring document data as a target; identifier generating step S1802 of carrying out the canonicalization process and the type standardization process for the target document data and generating an identifier from all or part of the document data; identifier replacement process step S1803 of replacing all or part of the document data with the generated identifier; difference data adding step S1804 of defining the document data or part thereof replaced with the identifier, as default, and adding difference data therefrom to the document data; and transmitting step S1805 of transmitting the document data generated trough the above processes.

FIG. 20 is a block diagram showing a configuration of identifier transmitting apparatus 2101 for transmitting identifier-integrated document data, using the identifier transmitting method according to the present embodiment. As shown in the figure, the identifier transmitting apparatus 2101 is comprised of target document data acquiring part 1102 for acquiring target document data; identifier generating part 1103 for carrying out the canonicalization process and the type standardization process and generating an identifier; and identifier transmitting part 2102 for performing an identifier adding process for the target document and transmitting the document data.

The identifier transmitting part 2102 is comprised of identifier replacement processing part 2103 for replacing all or part of the document data with an identifier generated by the identifier generating part 1103; difference data adding part 2104 for defining the document data or part thereof replaced with the identifier, as default, and adding difference data therefrom to the document data; and transmitting part 2105 for transmitting the document data generated through the above processes.

FIG. 21 shows an example of target document data. As shown in the figure, three constituent elements of <ccpp:component> . . . </ccpp:component> are described in the target document data. When the target document data is processed in the identifier generating step S1802, identifiers are generated for the respective constituent elements.

FIG. 22 shows an example of partly identifier-integrated document data in which partial descriptions (constituent element 1 and constituent element 2) in the document data shown in FIG. 21 are replaced by their respective identifiers and in which constituent element 3 is described as additional data, as an example of document data transmitted by the identifier transmitting method according to the present embodiment. As seen from the figure, the replacement of constituent element 1 and constituent element 2 with the identifiers can decrease the data volume of the entire document data.

Figure 23:
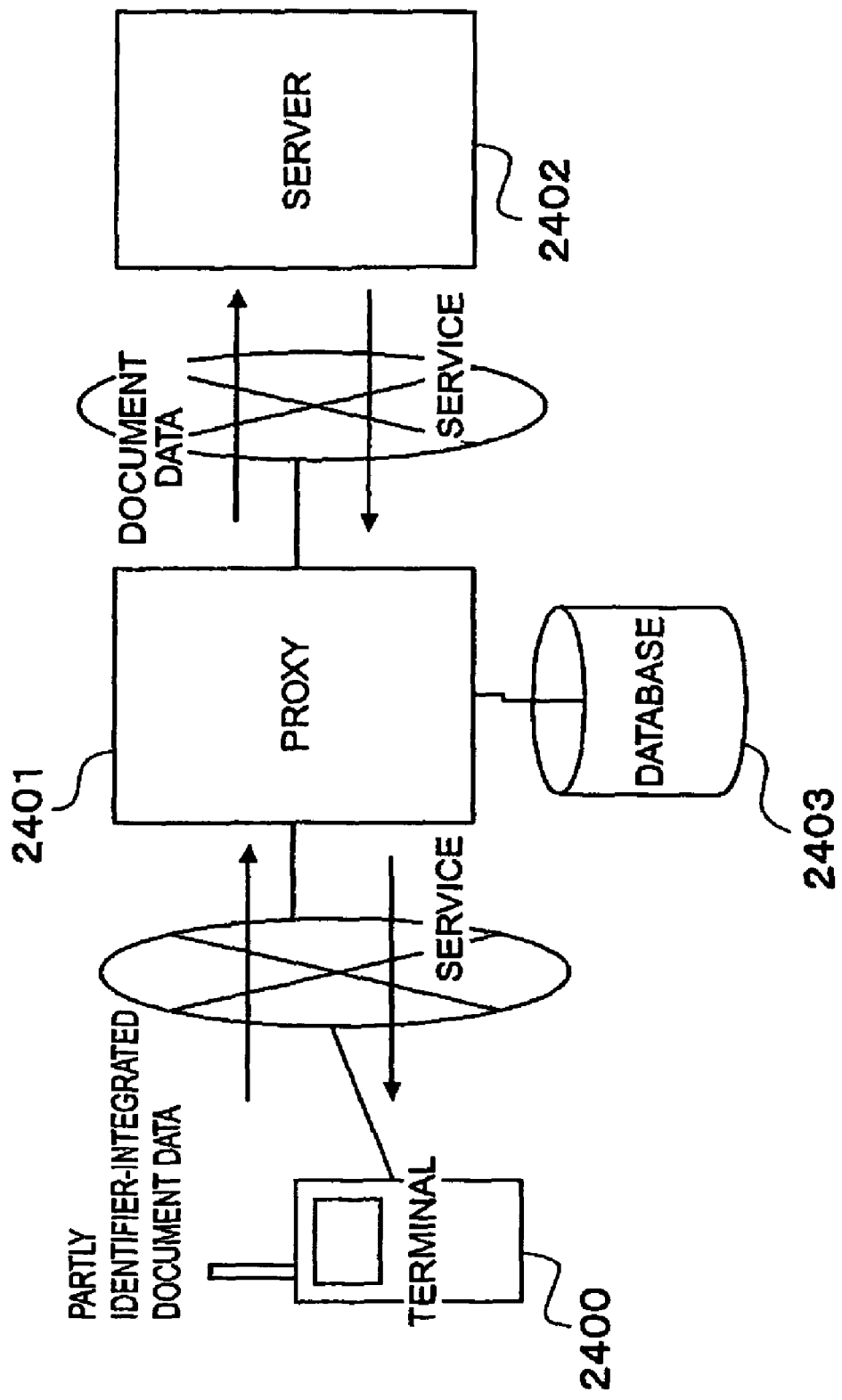
FIG. 23 is a diagram showing an example of the service system using the partly identifier-integrated document data transmitted by the identifier transmitting method according to another embodiment.

FIG. 23 is a diagram showing an example of a service system using the partly identifier-integrated document data transmitted by the identifier transmitting method according to the present embodiment. As shown in the figure, the service system is composed of terminal 2400 for transmitting the partly identifier-integrated document data transmitted by the identifier transmitting method of the present embodiment; proxy 2401 for receiving the partly identifier-integrated document data, performing an expansion to recover the original constituent elements from the partial identifiers to generate the original document data, and transmitting it; and server 2402 for receiving the document data and providing a service. The proxy 2401 is connected to database 2403 in which partial identifiers and original constituent elements are stored in correlation with each other. The terminal 2400 is allowed to transmit data after replacing each constituent element already having been transmitted through the proxy, in the document data originally to be transmitted to the server, with an identifier, and it thus becomes feasible to use the method of the present embodiment as a document data transmitting method with a lighter load on the network.

[Fifth Embodiment]

Figure 24:
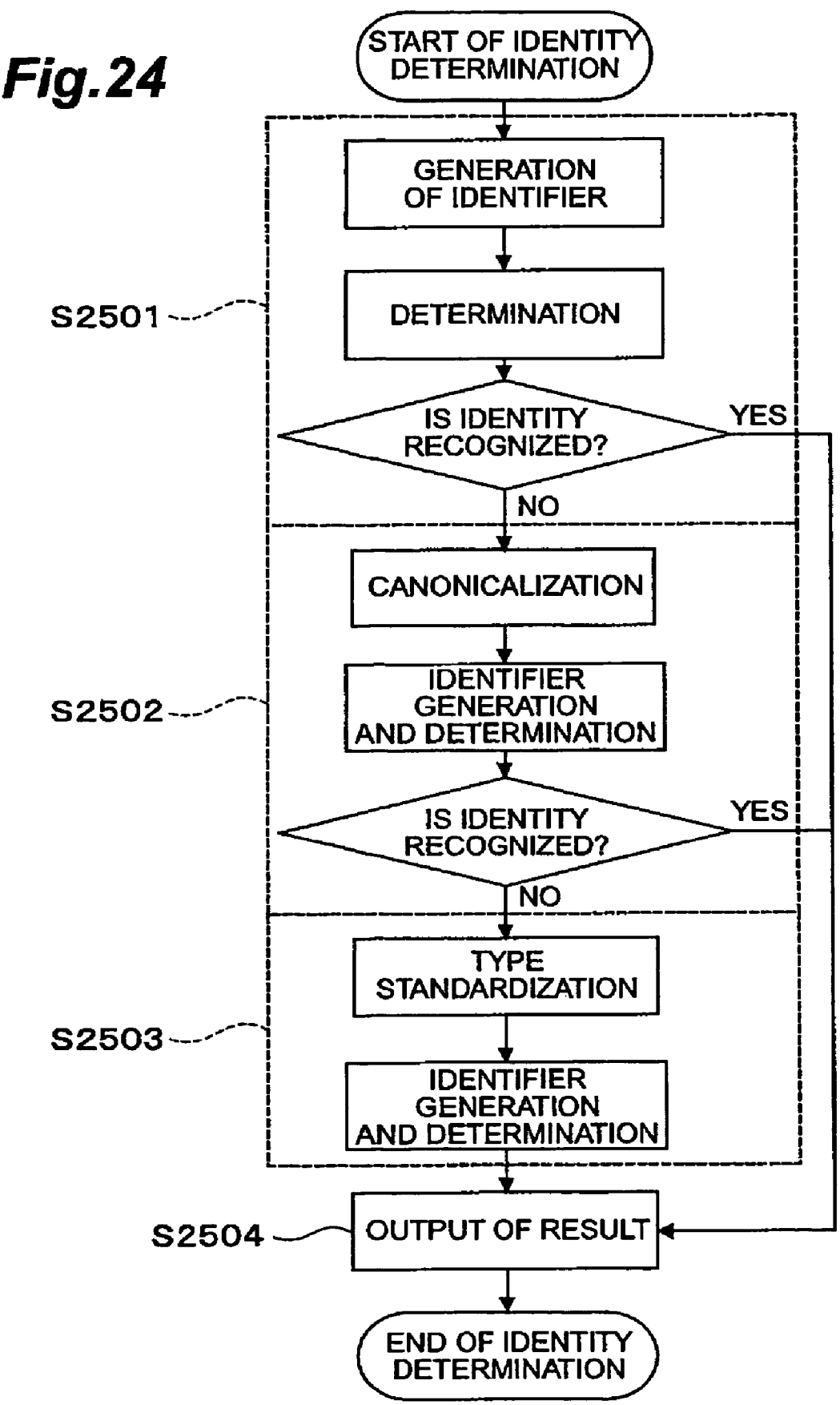
FIG. 24 is a flowchart showing the operation of the step-by-step identity determining method according to another embodiment.

The fifth embodiment of the present invention will be described below with reference to the drawings. FIG. 24 is a flowchart showing the operation of the step-by-step identity determining method according to the present embodiment.

As shown in the figure, the step-by-step identity determining method is comprised of first determination step S2501 of generating an identifier directly from input document data and making a determination on identity; second determination step S2502 of performing the canonicalization process, then generating an identifier, and thereafter making a determination on identity; third determination step S2503 of performing the type standardization process with the use of the class definition file, then generating an identifier, and making a determination on identity; and result output step S2504 of outputting the result of the determination.

When no identity is recognized in the first determination step S2501, the processing is transferred to the second determination step S2502. When no identity is recognized in the second determination step S2502, either, as in the first determination step S2501, the processing is transferred to the third determination step S2503. When identity is recognized in either of the first determination step S2501 and the second determination step S2502, the processes in and after the next step are skipped and the result of the determination is outputted in the result output step S2504. The third determination step is to transfer the result of the determination on identity to the result output step S2504, and then the result of the determination is outputted.

The present invention enables an identical identifier to be generated for multiple document data with the same meaning, or for portions thereof, and thus enables the identification of multiple document data with the same meaning.

The present invention also achieves reduction of processing time while permitting the skipping of the process by the identity determining method in the case where input data is document data already processed in the past, at terminals or servers.

The present invention also permits identity to be determined in the encoded data state of document data, and thus enables the skipping of processing also including the decoding process at terminals or servers, thus decreasing the processing time.

Since the present invention also enables document data to be generated by replacing all or part of document data with an identifier generated from all or part of document data with the same meaning, it becomes feasible to reduce the data volume of the document data and to decrease the load on the network, for example, by transmitting the document data while replacing an already-transmitted portion with an identifier.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An identifier generating method comprising:
a canonicalization process step of subjecting document data to a canonicalization process to correct fluctuation of expression including at least one of deletion of redundant white spaces and recovery from omission of a close tag; and
an identifier generating step of generating an identifier uniquely specifying the document data or part thereof, based on all or part of the document data having been subjected to the canonicalization process in the canonicalization process step; and
an identity determining step of determining whether there is a common portion between one document data and another document data, based on the identifier having been generated in the identifier generating step, wherein
a cache preliminarily stores the identifier having been generated by the identifier generating step, in correlation with the document data or a result of a predetermined process on the document data, and
wherein the identity determining step performs a search inside the cache on the basis of the identifier of the document data as a target for a determination on identity, which has been generated in the identifier generating step, determines that there exists identical document data, if the same identifier as the aforementioned identifier is present, and determines that there exists no identical document data, if the same identifier as the aforementioned identifier is absent.

2. An identity determining method comprising:
a canonicalization process step of subjecting document data to a canonicalization process to correct fluctuation of expression including at least one of deletion of redundant white spaces and recovery from omission of a close tag;
an identifier generating step of generating an identifier uniquely specifying the document data or part thereof, based on all or part of the document data having been subjected to the canonicalization process in the canonicalization process step; and
an identity determining step of determining whether there is a common portion between one document data and another document data, based on the identifier having been generated in the identifier generating step, wherein
a cache preliminarily stores the identifier having been generated by the identifier generating step, in correlation with the document data or a result of a predetermined process on the document data, and
wherein the identity determining step performs a search inside the cache on the basis of the identifier of the document data as a target for a determination on identity, which has been generated by the identifier generating step, determines that there exists identical document data, if the same identifier as the aforementioned identifier is present, and determines that there exists no identical document data, if the same identifier as the aforementioned identifier is absent.

3. An identifier transmitting method comprising:
a canonicalization process step of subjecting document data to a canonicalization process to correct fluctuation of expression including at least one of deletion of redundant white spaces and recovery from omission of a close tag;
an identifier generating step of generating an identifier uniquely specifying the document data or part thereof, based on all or part of the document data having been subjected to the canonicalization process in the canonicalization process step; and
an identifier transmitting step of transmitting the identifier having been generated in the identifier generating step, wherein
a cache preliminarily stores the identifier having been generated by the identifier generating step, in correlation with the document data or a result of a predetermined process on the document data,
wherein an identity determining step performs a search inside the cache on the basis of the identifier of the document data as a target for a determination on identity, which has been generated by the identifier generating step, determines that there exists identical document data, if the same identifier as the aforementioned identifier is present, and determines that there exists no identical document data, if the same identifier as the aforementioned identifier is absent.

4. An identifier generating apparatus comprising:
canonicalization process means for subjecting document data to a canonicalization process to correct fluctuation of expression including at least one of deletion of redundant white spaces and recovery from omission of a close tag;
identifier generating means for generating an identifier uniquely specifying the document data or part thereof, based on all or part of the document data having been subjected to the canonicalization process by the canonicalization process means;
a cache configured to preliminarily store the identifier having been generated by the identifier generating means, in correlation with the document data or a result of a predetermined process on the document data,
wherein an identity determining means is configured to perform a search inside the cache on the basis of the identifier of the document data as a target for a determination on identity, which has been generated by the identifier generating means, determine that there exists identical document data, if the same identifier as the aforementioned identifier is present, and determine that there exists no identical document data, if the same identifier as the aforementioned identifier is absent.

5. The identifier generating apparatus according to claim 4, wherein the canonicalization process means comprises type standardization process means for, using a class definition file of the document data describing a definition of a type, standardizing a type of expression for a value described in the document data, in accordance with the type defined by the class definition file.

6. The identifier generating apparatus according to claim 5, wherein the type standardization process means is configured to standardize an accuracy of numerical data described in the document data, in accordance with a definition of a type for numerical data described in the class definition file of the document data.

7. The identifier generating apparatus according to claim 4, wherein the canonicalization process means comprises document data generating means for transforming first partial data and second partial data into document data in accordance with a predetermined transformation rule.

8. An identity determining apparatus comprising:
canonicalization process means for subjecting document data to a canonicalization process to correct fluctuation of expression including at least one of deletion of redundant white spaces and recovery from omission of a close tag;
identifier generating means for generating an identifier uniquely specifying the document data or part thereof, based on all or part of the document data having been subjected to the canonicalization process by the canonicalization process means;
identity determining means for determining whether there is a common portion between one document data and another document data, based on the identifier having been generated by the identifier generating means; and
a cache preliminarily storing the identifier having been generated by the identifier generating means, in correlation with the document data or a result of a predetermined process on the document data,
wherein the identity determining means is configured to:
perform a search inside the cache on the basis of the identifier of the document data as a target for a determination on identity, which has been generated by the identifier generating means, determine that there exists identical document data, if the same identifier as the aforementioned identifier is present, and determine that there exists no identical document data, if the same identifier as the aforementioned identifier is absent.

9. The identity determining apparatus according to claim 8, wherein the canonicalization process means comprises type standardization process means for, using a class definition file of the document data describing a definition of a type, standardizing a type of expression for a value described in the document data, in accordance with the type defined by the class definition file.

10. The identity determining apparatus according to claim 9, wherein the type standardization process means is configured to standardize an accuracy of numerical data described in the document data, in accordance with a definition of a type for numerical data described in the class definition file of the document data.

11. The identity determining apparatus according to claim 8, wherein the canonicalization process means comprises document data generating means for transforming first partial data and second partial data into document data in accordance with a predetermined transformation rule.

12. The identity determining apparatus according to claim 8, further comprising second identifier generating means for generating an identifier uniquely specifying the document data or part thereof, based on all or part of the document data, prior to execution of the canonicalization process by the canonicalization process means,
wherein identity between one document data and another document data is determined on the basis of the identifier having been generated by the second identifier generating means and wherein if they are determined not to be identical, the canonicalization process means performs the canonicalization process of the document data.

13. An identity determining apparatus comprising:
canonicalization process means for subjecting document data to a canonicalization process to correct fluctuation of expression including at least one of deletion of redundant white spaces and recovery from omission of a close tag;

identifier generating means for, based on all or part of encoded data of document data, generating an identifier uniquely specifying the document data or part thereof;

identity determining means for determining whether there exists a common portion between one document data and another document data, based on the identifier having been generated by the identifier generating means, and a cache preliminarily storing the identifier having been generated by the identifier generating means, in correlation with the document data or a result of a predetermined process on the document data, wherein the identity determining means is configured to:

perform a search inside the cache on the basis of the identifier of the document data as a target for a determination on identity, which has been generated by the identifier generating means, determine that there exists identical document data, if the same identifier as the aforementioned identifier is present, and determine that there exists no identical document data, if the same identifier as the aforementioned identifier is absent.

14. The identity determining apparatus according to claim 13, wherein an instruction to skip a process of decoding the encoded data of the document data is issued when the identity determining means determines that the two document data are identical.

15. An identifier transmitting apparatus comprising:

canonicalization process means for subjecting document data to a canonicalization process to correct fluctuation of expression including at least one of deletion of redundant white spaces and recovery from omission of a close tag;

identifier generating means for generating an identifier uniquely specifying the document data or part thereof, based on all or part of the document data having been subjected to the canonicalization process by the canonicalization process means;

identifier transmitting means for transmitting the identifier having been generated by the identifier generating means, and a cache preliminarily storing the identifier having been generated by the identifier generating means, in correlation with the document data or a result of a predetermined process on the document data, wherein the identity determining means is configured to:

perform a search inside the cache on the basis of the identifier of the document data as a target for a determination on identity, which has been generated by the identifier generating means, determine that there exists identical document data, if the same identifier as the aforementioned identifier is present, and determine that there exists no identical document data, if the same identifier as the aforementioned identifier is absent.

16. The identifier transmitting apparatus according to claim 15, wherein the identifier transmitting means comprises transmitted data generating means for generating data obtained by replacing all or part of the document data by the identifier.

17. The identifier transmitting apparatus according to claim 16, wherein the transmitted data generating means is configured to generate transmitted data described by an identifier uniquely specifying partial data included in the document data, and difference data between the partial data and the document data.

* * * * *